United States Patent
Goto

(10) Patent No.: US 10,137,872 B2
(45) Date of Patent: Nov. 27, 2018

(54) ACCELERATION/DECELERATION CONTROL APPARATUS

(71) Applicant: HITACHI AUTOMOTIVE SYSTEMS, LTD., Ibaraki (JP)

(72) Inventor: Daisuke Goto, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/740,259

(22) PCT Filed: Jun. 8, 2016

(86) PCT No.: PCT/JP2016/066990
§ 371 (c)(1),
(2) Date: Dec. 27, 2017

(87) PCT Pub. No.: WO2017/002557
PCT Pub. Date: Jan. 5, 2017

(65) Prior Publication Data
US 2018/0186352 A1     Jul. 5, 2018

(30) Foreign Application Priority Data
Jun. 30, 2015   (JP) ................................. 2015-131323

(51) Int. Cl.
*B60T 8/17*     (2006.01)
*B60T 8/1769*   (2006.01)
(Continued)

(52) U.S. Cl.
CPC .............. *B60T 8/1769* (2013.01); *B60L 7/18* (2013.01); *B60L 15/2009* (2013.01);
(Continued)

(58) Field of Classification Search
CPC . B60T 8/1769; B60T 8/17; B60T 8/00; B60L 15/2018; B60L 7/18;
(Continued)

(56) References Cited

U.S. PATENT DOCUMENTS

2001/0027368 A1\* 10/2001 Minowa ................. B60K 26/02
701/70
2005/0023071 A1\*  2/2005 Ahnafield ............. B60W 30/18
180/333
(Continued)

FOREIGN PATENT DOCUMENTS

| JP | 2006-137324 | 6/2006 |
|---|---|---|
| JP | 2006-151323 | 6/2006 |

(Continued)

OTHER PUBLICATIONS

International Search Report dated Sep. 13, 2016 in International Application No. PCT/JP2016/066990.

*Primary Examiner* — Joseph Dallo
(74) *Attorney, Agent, or Firm* — Wenderoth, Lind & Ponack, L.L.P.

(57) ABSTRACT

An acceleration/deceleration control apparatus includes a mode switching portion configured to switch a normal mode of performing acceleration control in response to an operation on an accelerator pedal and also performing deceleration control in response to an operation on a brake pedal, and a one-pedal mode of performing both the acceleration control and the deceleration control in response to the operation on the accelerator pedal according to a switching operation performed by a driver. Where a mode is switched from the normal mode to the one-pedal mode, one-pedal instruction switching portion (35B) of the acceleration/deceleration control apparatus outputs such one-pedal acceleration/deceleration instruction value A(Xa) that a result of adding a non-one-pedal acceleration instruction value B1(Xb) for the (Continued)

one-pedal mode and a one-pedal acceleration instruction value Ab(Xa) for the one-pedal mode after the mode is switched matches non-one-pedal deceleration instruction value Bn(xb) for the normal mode before the mode is switched.

5 Claims, 23 Drawing Sheets

(51) Int. Cl.
*B60T 8/00* (2006.01)
*B60W 30/18* (2012.01)
*B60W 30/182* (2012.01)
*B60L 7/18* (2006.01)
*B60L 15/20* (2006.01)

(52) U.S. Cl.
CPC ............ *B60L 15/2018* (2013.01); *B60T 8/00* (2013.01); *B60T 8/17* (2013.01); *B60W 30/18* (2013.01); *B60W 30/182* (2013.01); *B60L 2250/26* (2013.01); *B60W 2540/10* (2013.01); *B60W 2540/12* (2013.01); *B60Y 2200/91* (2013.01); *B60Y 2200/92* (2013.01); *Y02T 10/7258* (2013.01)

(58) Field of Classification Search
CPC . B60L 15/2009; B60L 2250/26; B60W 30/18; B60W 30/182; B60W 2540/12; B60W 2540/10; B60Y 2200/91; B60Y 2200/92; Y02T 10/7258

See application file for complete search history.

(56) References Cited

U.S. PATENT DOCUMENTS

| 2011/0066342 | A1* | 3/2011 | Ozaki ..................... B60T 7/042 701/70 |
| 2012/0118652 | A1* | 5/2012 | Yamamoto .......... B60L 15/2036 180/65.6 |
| 2012/0139329 | A1* | 6/2012 | Fabini ....................... B60L 7/10 303/3 |
| 2012/0322615 | A1* | 12/2012 | Matsuzaki .......... F16H 61/0246 477/79 |
| 2015/0120130 | A1* | 4/2015 | Zhou ....................... B60L 1/003 701/29.2 |
| 2016/0207418 | A1* | 7/2016 | Bergstrom .......... B60L 11/1879 |
| 2016/0236672 | A1* | 8/2016 | Yanagida .............. B60W 10/06 |
| 2017/0297547 | A1* | 10/2017 | Goto ........................ B60T 7/12 |
| 2017/0355372 | A1* | 12/2017 | Kuroshita ........... B60W 30/188 |

FOREIGN PATENT DOCUMENTS

| JP | 2006-175944 | 7/2006 |
| JP | 2006-177442 | 7/2006 |
| JP | 2010-284979 | 12/2010 |
| JP | 2013-217242 | 10/2013 |

* cited by examiner

ACCELERATION/DECELERATION CONTROL APPARATUS

TECHNICAL FIELD

The present invention relates to an acceleration/deceleration control apparatus having one-pedal mode of performing both acceleration control and deceleration control of a vehicle in response to an operation on only one of an accelerator pedal and a brake pedal.

BACKGROUND ART

As a running control apparatus mounted on a vehicle such as an automobile, there is known an acceleration/deceleration control apparatus for a vehicle system having a normal mode of performing acceleration control in response to an operation on an accelerator pedal and also performing deceleration control in response to an operation on a brake pedal and a one-pedal mode of performing both the acceleration control and the deceleration control in response to an operation on only one of the accelerator pedal and the brake pedal (PTL1).

For example, a vehicle's occupant (more specifically, a driver) operates a switch for switching the mode, by which the normal mode and the one-pedal mode can be switched. Then, the acceleration/deceleration control apparatus discussed in PTL 1 includes a filter portion that prevents or reduces a change in a target acceleration/deceleration to prevent a sudden change in a characteristic of the vehicle when the mode is switched.

CITATION LIST

Patent Literature

PTL 1: Japanese Patent Application Public Disclosure No. 2006-137324

SUMMARY OF INVENTION

Technical Problem

However, the configuration discussed in PTL 1 may cause the occupant to feel uncomfortable when the mode is switched while the brake pedal or the accelerator pedal is being operated.

An object of the present invention is to provide an acceleration/deceleration control apparatus capable of eliminating or reducing the possibility of causing the occupant to feel uncomfortable.

Solution to Problem

To achieve the above-described, object, one aspect of the present invention is an acceleration/deceleration control apparatus for a vehicle system having a normal mode of performing acceleration control in response to an operation on an accelerator pedal and performing deceleration control in response to an operation on a brake pedal, and a one-pedal mode of performing both the acceleration control and the deceleration control in response to an operation on any one of the accelerator pedal and the brake pedal and performing only any one of the acceleration control and the deceleration control in response to an operation on the other of pedals. The vehicle system includes a mode switching unit configured to switch the one-pedal mode and the normal mode according to a switching operation performed by an occupant. The acceleration/deceleration control apparatus switches a characteristic of a non-one-pedal acceleration instruction value or a non-one-pedal deceleration instruction value calculated according to an amount of the operation or the other of pedals during the one-pedal mode according to the mode switching using the mode switching unit. The acceleration/deceleration control apparatus is configured to set a result of adding the non-one-pedal acceleration instruction value or the non-one-pedal deceleration instruction value to a one-penal acceleration/deceleration instruction value calculated according to the operation on the one of pedals for performing both the acceleration control and the deceleration control as a target acceleration/deceleration instruction of a vehicle in the one-pedal mode. In a case where the mode is switched with use of the mode switching unit while the other of pedals is being operated during the one-pedal mode, the acceleration/deceleration control apparatus switches an instruction value characteristic or the other of pedals that is being operated after maintaining an acceleration or a deceleration before this mode switching.

Advantageous Effects of Invention

According to the present invention, the possibility of causing the driver to feel uncomfortable can be eliminated or reduced.

DESCRIPTION OF EMBODIMENTS

FIG. 1 schematically illustrates a vehicle on which an acceleration/deceleration control apparatus according to an embodiment is mounted.

Figure 25:
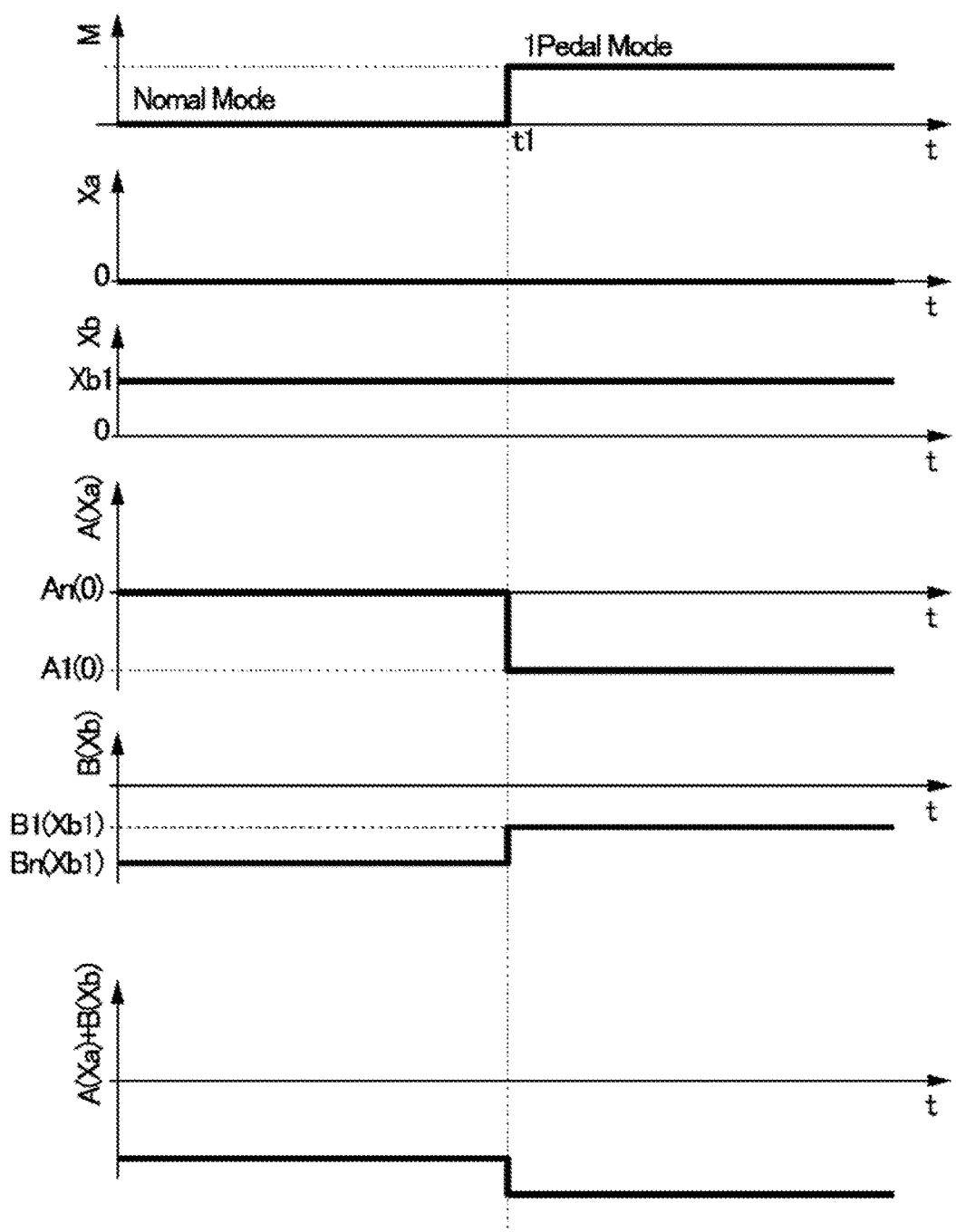
Figure 26:
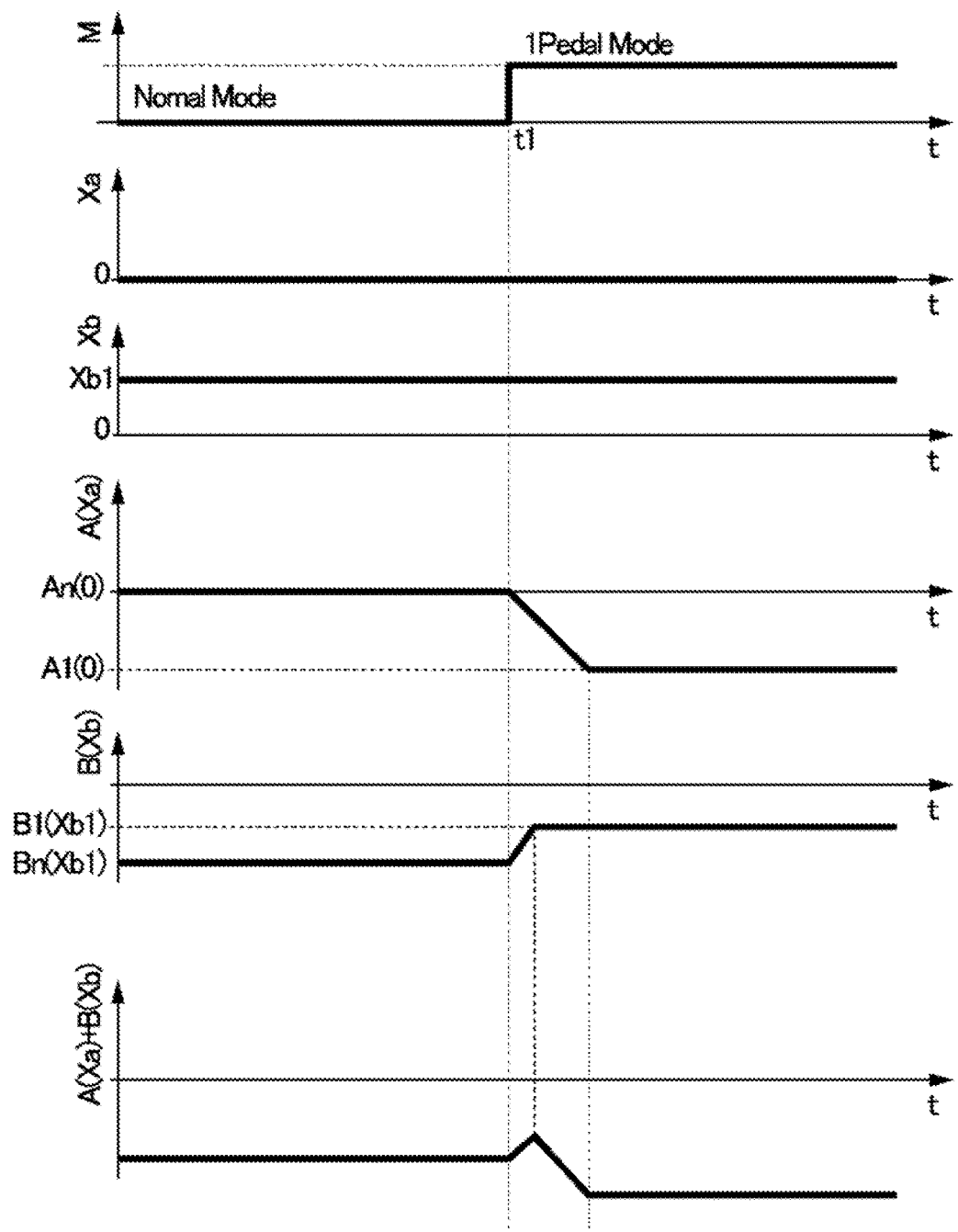

FIG. 25 illustrates characteristic lines indicating one example of the changes in each of the operation amounts and each of the instruction values over time when the mode is switched from the normal mode to the one-pedal mode according to a comparative example, FIG. 26 illustrates characteristic lines indicating one example of the changes in each of the operation amounts and each of the instruction values over time when the mode is switched from the normal mode to the one-pedal mode according to another comparative example.

Figure 27:
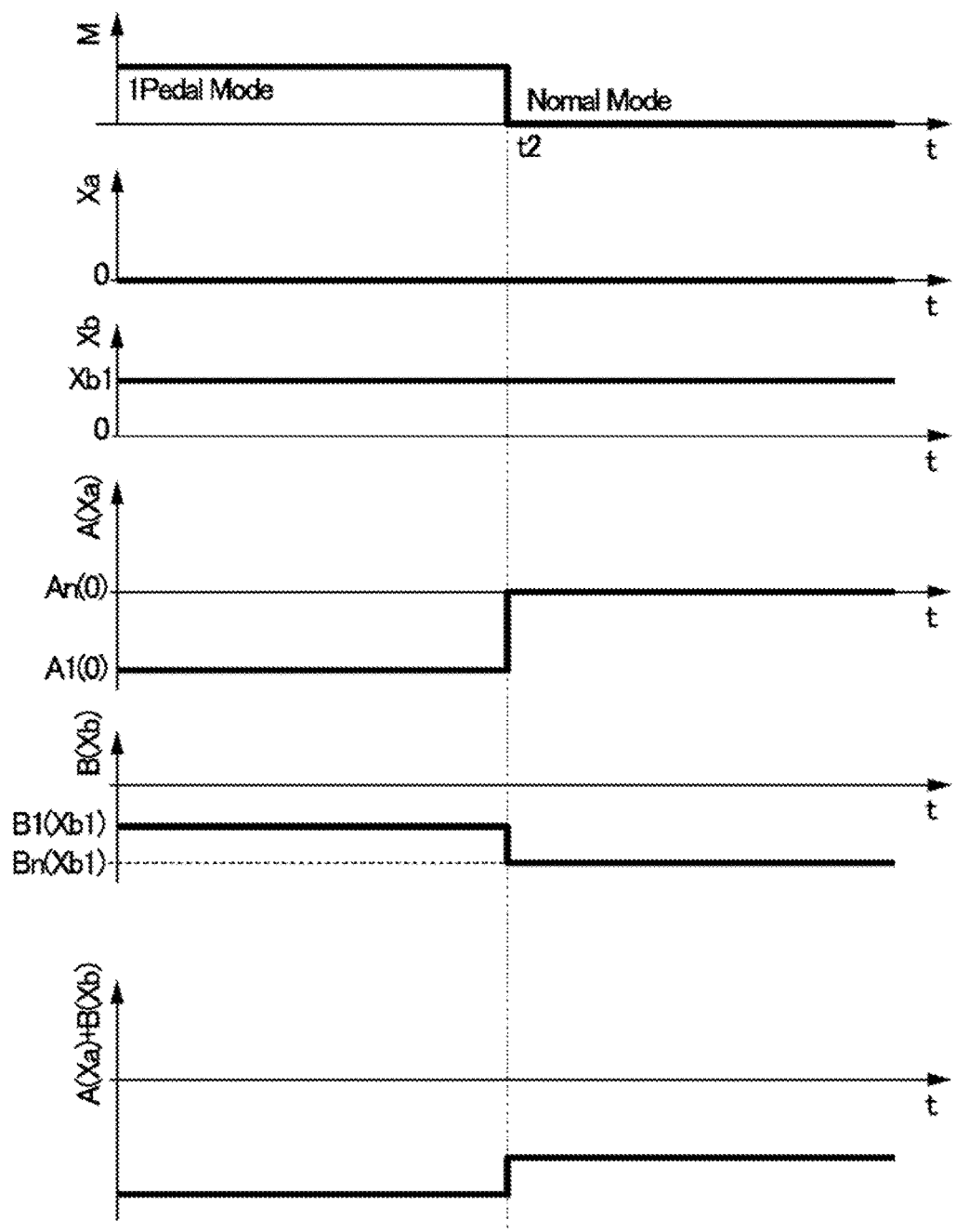

FIG. 27 illustrates characteristic lines indicating one example of the changes in each of the operation amounts and each of the instruction values over time when the mode is switched from the one-pedal mode to the normal mode according to the comparative example.

Figure 28:
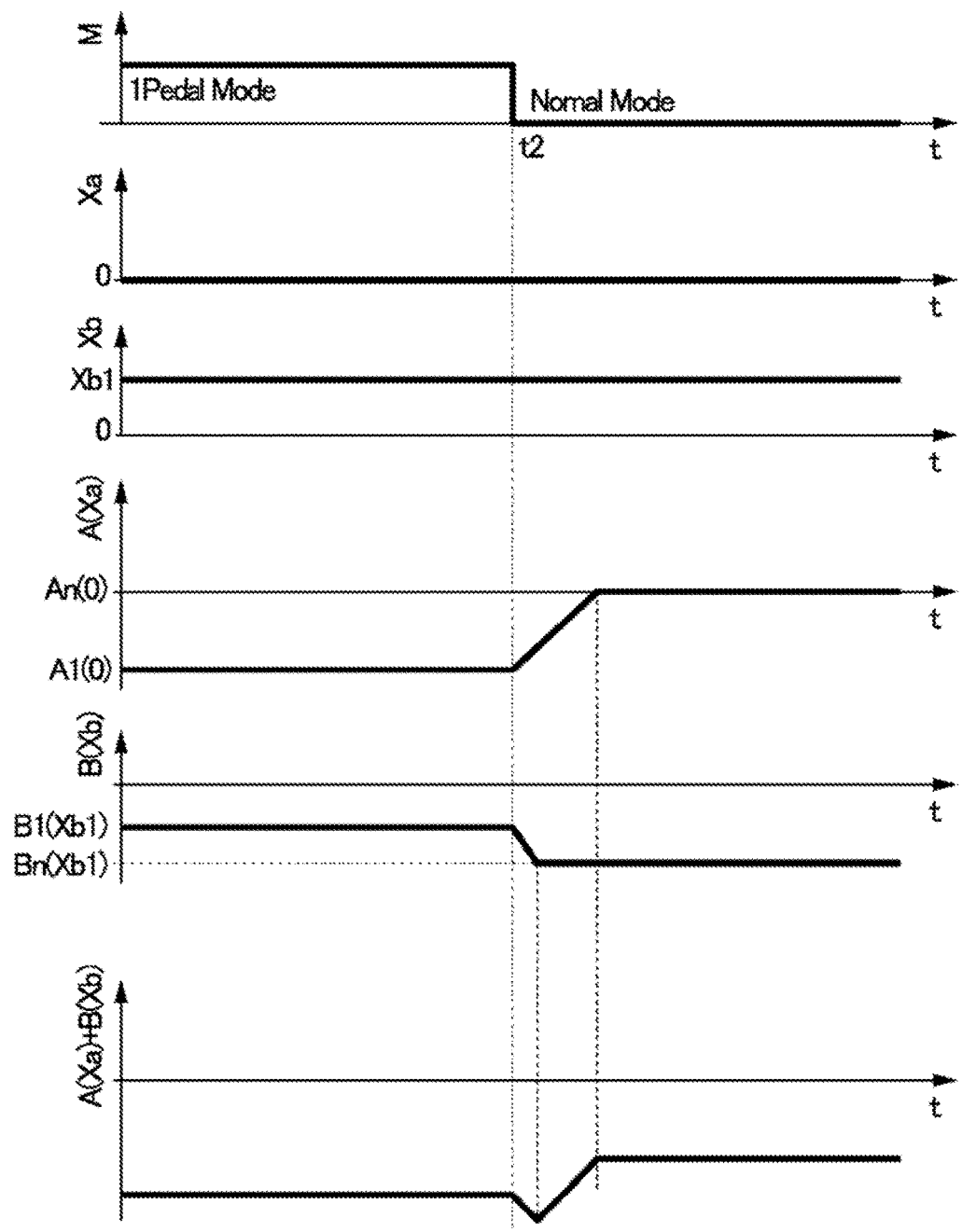

FIG. 28 illustrates characteristic lines indicating one example of the changes in each of the operation amounts and each of the instruction values over time when the mode is switched from the one-pedal mode to the normal mode according to the other comparative example.

Figure 29:
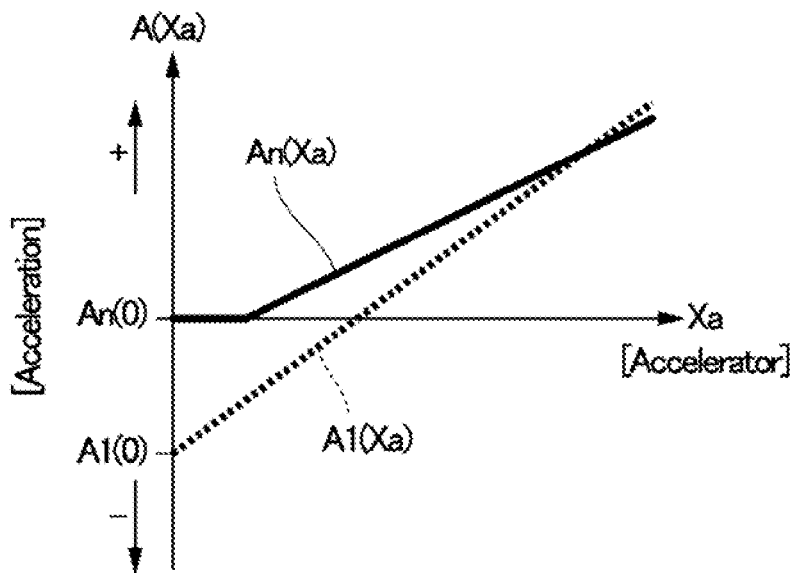

FIG. 29 illustrates characteristic lines indicating one example of (one-pedal) acceleration instruction value characteristics with respect to the accelerator pedal operation amount when the mode is the normal mode and when the mode is the one-pedal mode.

Figure 30:
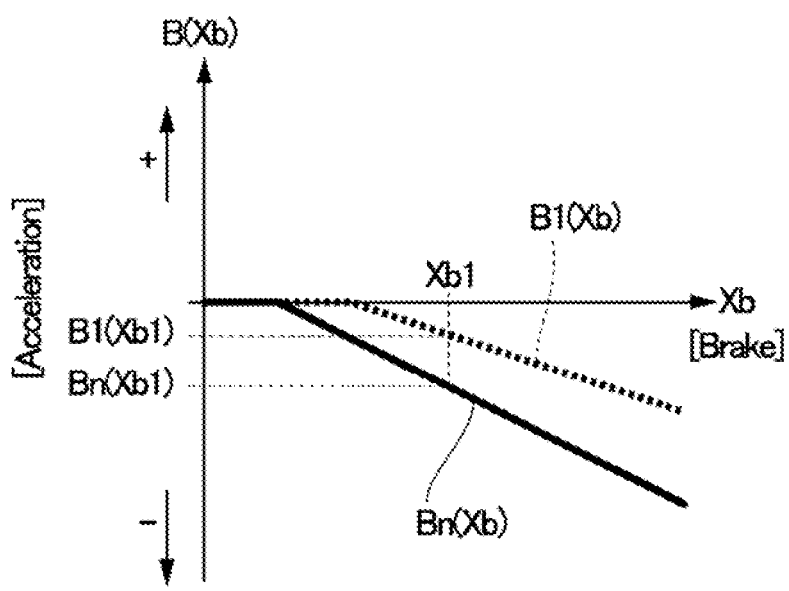

FIG. 30 illustrates characteristic lines indicating one example of (non-one-petal) acceleration instruction value characteristics with respect to the brake pedal operation amount when the mode is the normal mode and when the mode is the one-pedal mode.

Figure 31:
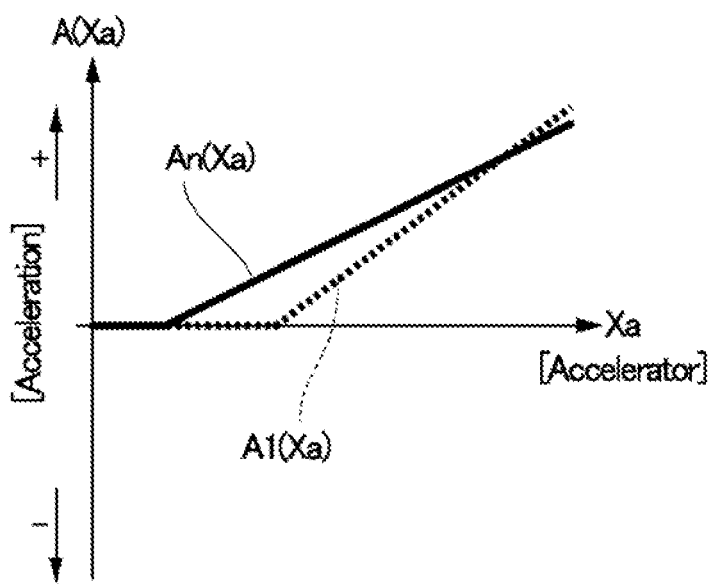

FIG. 31 illustrates characteristic lines indicating another example of the (non-one-pedal) acceleration instruction value characteristics with respect to the accelerator pedal operation amount when the mode is the normal mode and when the mode is the one-pedal mode.

Figure 32:
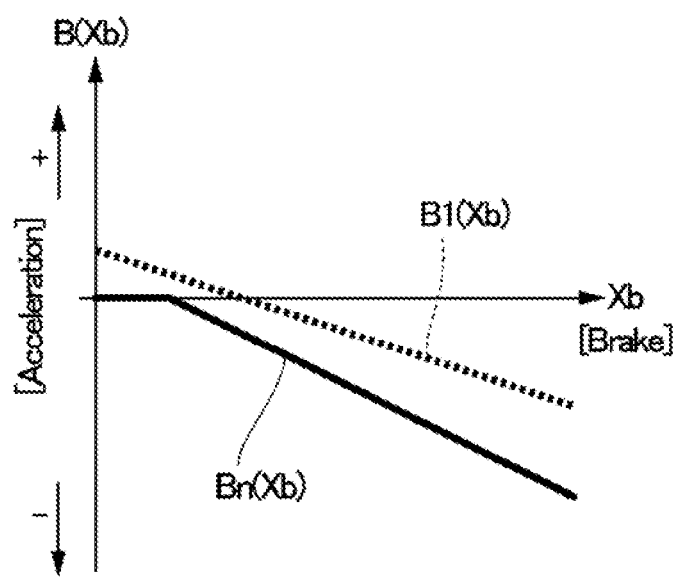

FIG. 32 illustrates characteristic lines indicating another example of the (one-pedal) acceleration instruction value characteristics with respect to the pedal operation amount when the mode is the normal mode and when the mode is the one-pedal mode.

DESCRIPTION OF EMBODIMENTS

In the following description, an acceleration/deceleration control apparatus according to embodiments will be described in detail with reference to the accompanying drawings based on an example in which this acceleration/deceleration control apparatus is mounted on a four-wheeled automobile.

Figure 1:
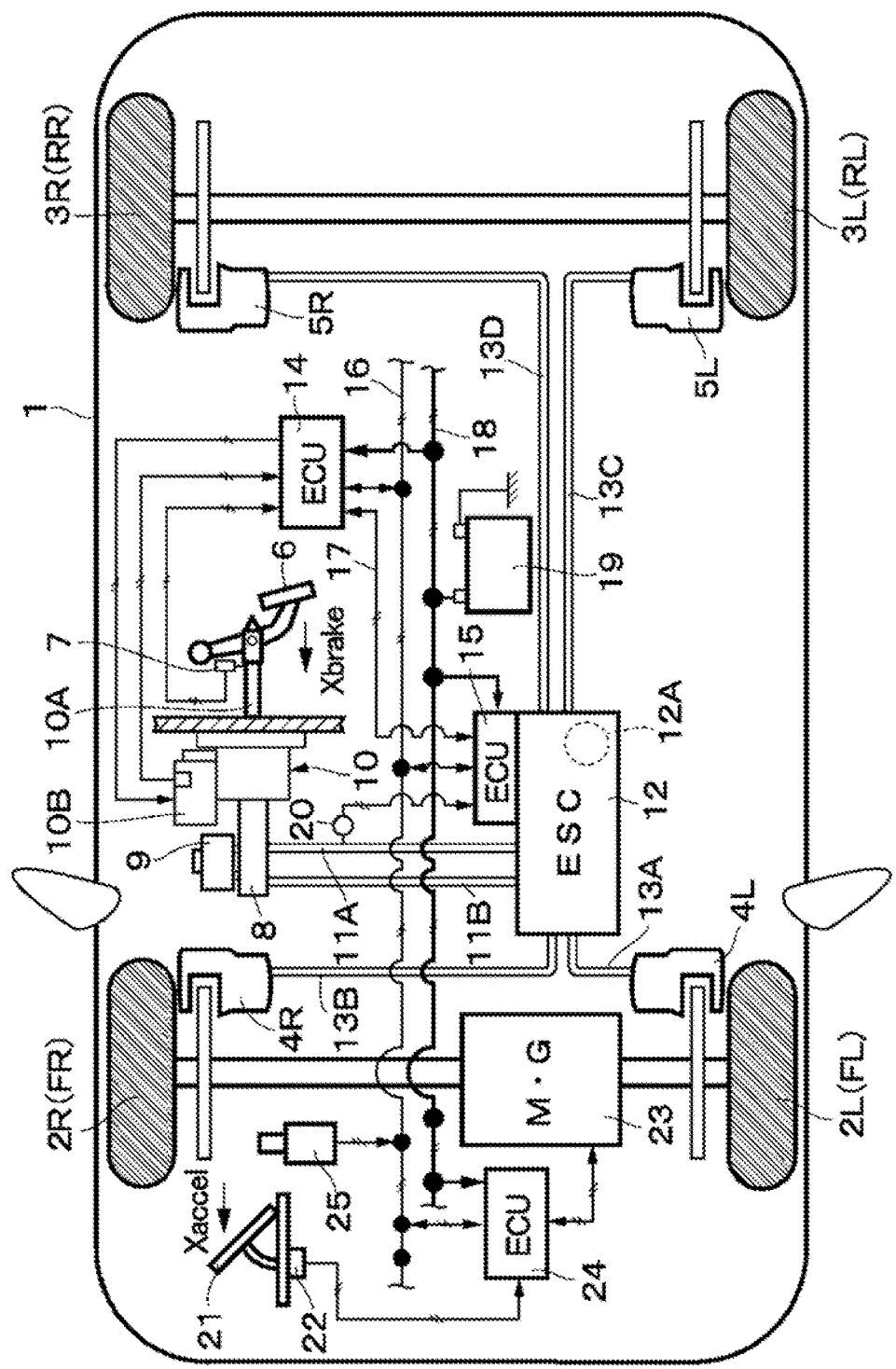

FIGS. 1 to 7 illustrate a first embodiment. In FIG. 1, four wheels in total that include front left and right wheels 2L and 2R and rear left and right wheels 3L and 3R are mounted under (on a road surface side of) a vehicle body 1 forming a main structure of a vehicle. Front wheel-side wheel cylinders 4L and 4R are mounted on the front left and right wheels 2L and 2R, respectively, and rear wheel-side wheel cylinders 5L and 5R are mounted on the rear left and right wheels 3L and 3R, respectively. Each of these wheel cylinders 4L, 4R, 5L, and 5R serve as a brake mechanism (a frictional brake mechanism) that provides a braking force to the respective wheels 2L, 2R, 3L, and 3R, and is constructed with use of, for example, a hydraulic disk brake or a drum brake.

A brake pedal 6 is provided on a dash board side of the vehicle body 1. The brake pedal 6 is operated by being pressed in an Xbrake direction indicated by an arrow by an occupant (a person sitting in the vehicle), more specifically, a driver when a brake operation is performed on the vehicle. Each of the wheel cylinders 4L, 4R, 5L, and 5R provides the braking force to the wheels 2L, 2R, 3L, and 3R, respectively, based on an operation on the brake pedal 6. Then, a brake operation sensor 7 is provided on the brake pedal 6 (more specifically, an input rod 10A of an electric booster 10). The brake operation sensor 7 detects a brake operation amount (a brake pedal operation amount) input by the driver, The brake operation sensor 7 serves as a brake pedal operation amount detection portion 33 (refer to FIG. 2), which will be described below. The brake operation sensor 7 can be embodied by, for example, a stroke sensor (a displacement sensor) that detects a stroke amount (a pedal stroke) of the brake pedal 6 (the input rod 10A). The brake operation sensor 7 can be embodied by not only the stroke sensor but also various kinds of sensors capable of detecting an operation amount (a pressing amount) of the brake pedal 6 (the input rod 10A), such as a force sensor that defects a pedal pressing force, and an angle sensor that detects a rotational angle (a tilt) of the brake pedal 6. In this case, the brake operation sensor 7 may be constructed with use of one (one kind of) sensor or may be constructed with use of a plurality of (a plurality of kinds of) sensors.

A signal detected by the brake operation sensor 7 (the brake operation amount) is output to a first ECU 14 and a vehicle data bus 16 via the first ECU 14. Further, the signal detected by the brake operation sensor is also output to a second ECU 15 via, for example, a communication line 17 connecting the first ECU 14 and the second ECU 15 to each other.

When the brake pedal 6 is operated by being pressed, a brake hydraulic pressure is generated in a master cylinder B via the electric booster 10. More specifically, the operation of pressing the brake pedal 6 is transmitted to the master cylinder 8 via the electric booster 10, thereby generating the brake hydraulic pressure In a hydraulic chamber (not illustrated) in the master cylinder 8. A reservoir is provided on the master cylinder 8. The reservoir 9 serves as a hydraulic fluid tank containing brake fluid therein. The reservoir 3 supplies and discharges (feeds and extracts) the brake fluid into or from the hydraulic chamber in the master cylinder 8.

The electric booster 10 is provided between, the brake pedal 6 and the master cylinder 8. The electric booster 10 serves as a boosting mechanism that powers up the pressing force (a brake operation force) to transmit this force to the master cylinder 8 at the time of the operation of pressing the brake pedal 6. The brake hydraulic pressure generated in the master cylinder 8 is transmitted to a hydraulic supply apparatus 12 via, for example, a pair of cylinder-side hydraulic pipes 11A and 11B.

The hydraulic supply apparatus 12 distributes the hydraulic pressure transmitted from the master cylinder 8 to each of the wheel cylinders 4L, 4R, 5L, and 5R via brake-side pipe portions 13A, 13B, 13C, and 13B, respectively. This distribution allows the braking force to be provided to each of the wheels 2L, 2R, 3L, and 3R independently of one another. The mechanism that generates the hydraulic pressure by the brake pedal 6 is not limited to the above-described configuration, and may be a mechanism that generates the hydraulic pressure according to the operation on the brake pedal 6, such as a mechanism based on the brake-by-wire method.

The electric booster 10 includes the input rod 10A, a booster piston (not illustrated), and an electric motor 10B. The input rod 10A is connected to the brake pedal 6. The booster piston can adjust (increase and reduce) the pressure (the brake hydraulic pressure) in the master cylinder 8. The electric booster 10B drives this booster piston. The electric booster 10 adjusts (increases and reduces) a pressure in each of the wheel cylinders 4L, 4R, 5L, and 5R (a wheel cylinder pressure) by adjusting the pressure in the master cylinder 8 (a master cylinder pressure) with use of the booster piston based on the driving of the electric motor 10B.

For example, the electric booster 10 drives the electric motor 10B according to the brake operation amount (the pressing amount) input by the driver, thereby increasing the pressure in the master cylinder 8 with use of the booster piston. As a result, the electric booster 10 can increase the driver's force operating (pressing) the brake pedal 6, thereby increasing the pressure in each of the wheel cylinders 4L, 4R, 5L, and 5R.

Further, the electric booster 10 drives the electric motor 10B according to a pressing amount of an accelerator pedal 21 when a one-pedal mode of performing both acceleration control and deceleration control in response to an operation on only the accelerator pedal 21 is selected, as will be described below. For example, when the pressing amount of the accelerator pedal 21 falls below a preset predetermined value, the electric booster 10 drives the electric motor 10B, thereby generating the hydraulic pressure in the master cylinder 8 with use of the booster piston. As a result, the electric booster 10 can (automatically) provide the braking force by increasing the pressure in each of the wheel cylinders 4L, 4R, 5L, and 5R in response to not only the operation on the brake pedal 6 but also the operation on the accelerator pedal 21.

The electric booster 10 variably controls the brake hydraulic pressure generated in the master cylinder 8 by driving the electric motor 10B based on an instruction (a driving current) from the first ECU 14. In other words, the electric booster 10 is connected to the first ECU 14 and is controlled by the first ECU 14. The first ECU 14 includes, for example, a microcomputer, and serves as a control unit for the electric booster that electrically control driving of the electric booster 10 (the electric motor 10B thereof).

An input side of the first ECU 14 is connected to the brake operation sensor 7, the vehicle data bus 16, and the communication line 17. The brake operation sensor 7 detects the operation amount of the brake pedal 6. The vehicle data bus 16 transmits and receives a signal to and from, for example, a third ECU 24, which is another vehicle device. The communication line 17 establishes communication between the first ECU 14 and the second ECU 15. The vehicle data bus 16 is, for example, a serial communication portion called V-CAN mounted on the vehicle, and functions to establish multiplex communication among a large number of electric devices mounted on the vehicle. Further, power is supplied from an in-vehicle battery 19 to the first ECU 14 via an in-vehicle power line 18. The second ECU 15 and the third ECU 24, which will be described below, are also connected to the power line 18 similarly to the first ECU 14, and also receive power supply from the in-vehicle battery via this power line 18.

On the other hand, an output side of the first ECU 14 is connected to the electric motor 10B, the vehicle data bus 16, and the communication line 17. The first ECU 14 controls the electric booster 10 (the electric motor 10B thereof) based on the brake pedal operation amount when, for example, a running mode is a normal mode of performing the acceleration control in response to the operation on the accelerator pedal 21 and performing the deceleration control in response to the operation on the brake pedal 6. On the other hand, the first ECU 14 controls the electric booster 10 (the electric motor 10B thereof) based on a braking instruction according to an accelerator pedal operation amount (a braking one-pedal acceleration instruction value, which will be described below) and the brake pedal operation amount, when the one-pedal mode is selected.

Acceleration/deceleration, control including the control of the electric booster 10 will be described in derail below.

A hydraulic sensor 20 is provided in the cylinder-side hydraulic pipe 11A. The hydraulic sensor 20 functions to detect the pressure (the brake hydraulic pressure) generated in the master cylinder 8, more specifically, a hydraulic pressure in the cylinder-side hydraulic pipe 11A. The hydraulic sensor 20 is electrically connected to the second ECU 15, and can also transmit a signal detected by the hydraulic sensor 20 from the second ECU 15 to the first ECU 14 via the communication line 17. FIG. 1 illustrates the hydraulic sensor 20 connected to only the second ECU 15, but the hydraulic sensor 20 may be configured to be connected to both the first ECU 14 and the second ECU 15.

The hydraulic supply apparatus 12 (hereinafter referred to as the ESC 12) is provided between the wheel cylinders 4L, 4R, 5L, and 5R, and the master cylinder 8. The ESC 12 functions to variably control the brake hydraulic pressure generated in the master cylinder 3 as the wheel cylinder pressure (a W/C pressure) for each of the wheels 2L, 2R, 3L, and 3R, and supply this brake hydraulic pressure to each of the wheel cylinders 4L, 4R, 5L, and 5R individually. In other words, the ESC 12 distributes and supplies the hydraulic pressure output from the master cylinder 8 via the cylinder-side hydraulic pipes 11A and 11B to the wheel cylinders 4L, 4R, 5L, and 5R via the brake-side pipe portions 13A, 13B, 13C, and 13D, respectively.

Then, the ESC 12 includes a plurality of control valves and a hydraulic pump (both of them are not illustrated), an electric motor 12A, and a reservoir for the hydraulic control (not illustrated). The hydraulic pump increases the brake hydraulic pressure. The electric motor 12A drives this hydraulic pump. The reservoir for the hydraulic control temporarily stores excess brake fluid therein.
Opening/closing of each of the control valves and driving of the electric motor 12A of the ESC 12 are controlled by the second ECU 15.

The second ECU 15 includes, for example, a microcomputer, and serves as a control unit for the hydraulic supply apparatus that electrically controls driving of the ESC 12 (each of the control valves and the electric motor 12A thereof). An input side of the second ECU 15 is connected to the hydraulic sensor 20, the vehicle data bus 16, and the communication line 17. An output side of the second ECU 15 is connected to each of the control valves, the electric motor 12A, the vehicle data bus 16, and the communication line 17.

The second ECU 15 controls the driving of each of the control valves, the electric motor 12A, and the like of the ESC 12 individually. By this control, the second ECU 15 performs control of reducing, holding, increasing or pressurizing the brake hydraulic pressure to be supplied from the brake-side pipe portions 13A, 13B, 13C, and 13D to the wheel cylinders 4L, 4R, 5L, and 5R, respectively, for each of the wheel cylinders 4L, 4R, 5L, and 5R individually.

In this case, the second ECU 15 can perform, for example, the following kinds of control (1) to (8) by driving activation of the ESC 12. The kinds of control performed by the second ECU 32 are: (1) braking force distribution control of appropriately distributing the braking force to each of the wheels 2L, 2R, 3L, and 3R according to a vertical load and the like when the vehicle is braked, (2) anti-lock brake control of preventing each of the wheels 2L, 2R, 3L, and 3R from being locked (slipped) by automatically adjusting the braking force provided to each of the wheels 2L, 2R, 3L, and 3R when the vehicle is braked, (3) vehicle stabilization control of stabilizing a behavior of the vehicle by preventing or reducing understeer and oversteer while detecting a sideslip of each of the wheels 2L, 2R, 3L, and 3R when the vehicle is running to thus appropriately automatically control the braking force to be provided to each of the wheels 2L, 2R, 3L, and 3R regardless of the operation amount of the brake pedal 6, (4) hill start aid control of aiding a start by holding a braked state on a slope (especially, an upslope), (5) traction control or preventing each or the wheels 2L, 2R, 3L, and 3R from idly spinning, for example, when the vehicle starts running, (6) adaptive cruise control of maintaining a predetermined distance to a vehicle running ahead, (7) traffic lane departure avoidance control of maintaining the vehicle within a traffic lane, and (8) obstacle avoidance control of avoiding a collision with an obstacle in front of or behind the vehicle.

The ESC 12 directly supplies the hydraulic pressure generated in the master cylinder 8 by the electric booster 10 to the wheel cylinders 4L, 4R, 5L, and 5R at the time of a normal operation in response to the brake operation performed by the driver. On the other hand, for example, the ESC 12 maintains the hydraulic pressure in each of the wheel cylinders 4L, 4R, 5L and 5R by closing a control valve for the pressure increase when performing the anti-lock brake control or the like, and discharges the hydraulic pressure in each of the wheel cylinders 4L, 4R, 5L, and 5R as if releasing it to the reservoir for the hydraulic control by opening a control valve for the pressure reduction when reducing the hydraulic pressure in each of the wheel cylinders 4L, 4R, 5L, and 5R.

Further, the ESC 12 activates the hydraulic pump by the electric motor 12A with a control valve for the supply opened, thereby supplying the brake fluid discharged from this hydraulic pump to the wheel cylinders 4L, 4R, 5L, and 5R when increasing or pressurizing the hydraulic pressure to be supplied to each of the wheel cylinders 4L, 4R, 5L, and 5R to perform, for example, the stabilization control (electronic stability control) when the vehicle is running. At this time, the brake fluid in the reservoir 9 is supplied from one side where the master cylinder 8 is located toward an intake side of the hydraulic pump. The vehicle may be configured to drive the ESC 12 (each of the control valves and the electric motor 12A thereof) according to the accelerator pedal operation amount to increase the pressure in each of the wheel cylinders 4L, 4R, 5L, and 5R, thereby providing the braking force, when the one-pedal mode is selected.

On the other hand, the accelerator pedal 21 is provided adjacent to the brake pedal 6 on the dash bode side of the vehicle body 1. FIG. 1 illustrates the accelerator pedal 21 and the brake pedal 6 as if they are separated in a longitudinal direction of the vehicle body, but they are illustrated in this manner to prevent the illustration from being complicated. Actually, the accelerator pedal 21 and the brake pedal 6 are provided adjacent to each other, for example, in a lateral direction on a foot side of a driver's seat.

The accelerator pedal 21 is operated by being pressed by the driver in an Xaccel direction indicated by an arrow when the vehicle is accelerated. A driving motor 23, which will be described below, provides a driving force to a wheel (the front wheels 2L and 2R in FIG. 1) based on the operation on the accelerator pedal 21. Now, an accelerator operation sensor 22 is provided on the accelerator pedal 21. The accelerator operation sensor 22 detects an accelerator operation amount (the accelerator pedal operation amount) input by the driver.

The accelerator operation sensor 22 serves as an accelerator pedal operation amount detection portion 32 (refer to FIG. 2), which will be described below. The accelerator operation sensor 22 can be embodied by, for example, a stroke sensor (a displacement sensor) that detects a stroke amount (a pedal stroke) of the accelerator pedal 21. The accelerator operation sensor 22 can be embodied by not only the stroke sensor but also various kinds of sensors capable of detecting an operation amount (a pressing amount) of the accelerator pedal 21, such as a force sensor detecting a pedal pressing force and an angle sensor that detects a tilt (a rotational angle) of the accelerator pedal 21. In this case, the accelerator operation sensor 22 may be constructed with use of one (one kind of) sensor or may be constructed with use of a plurality of (a plurality of kinds of) sensors. A signal detected by the accelerator operation sensor 22 (the accelerator operation amount) is output to, for example, the third ECU 24.

The driving motor (M/G) 23 is provided on one side of the vehicle body 1 where the front wheels 2L and 2R are located. The driving motor 23 provides a running driving force and a regenerative braking force to the front wheels 2L and 2R. The driving motor 23, which is a running motor, is configured as an electric motor (a generator motor) for vehicle driving that drives the wheels for causing the vehicle to run when, for example, the vehicle is accelerated, and generates power based on an inertial force of the vehicle (regeneration) when, for example, the vehicle is decelerated.

In other words, the driving motor 23 has a function as a motor (an electric motor) that generates a torque (a rotational force) for causing the vehicle to run based on, for example, power stored in an electric storage apparatus (not illustrated) of the vehicle, and a function as a generator (a power generator) that generates power based on the running inertial force of the vehicle. FIG. 1 illustrates only the driving motor 23 as a driving source of the vehicle, but the driving motor 23 serves as a driving source for running in a case where the vehicle is, for example, an electric car while the driving motor 23 and a not-illustrated engine (internal combustion engine) serve as the driving source for the running in a case where the vehicle is a hybrid car.

The driving motor 23 is controlled by the third ECU 24. The third ECU 24 includes a microcomputer similarly to the first and second ECUs 14 and 15, and serves as a control unit for the driving motor than controls a driving state (power running or regeneration) of the driving motor 23. The third ECU 24 functions to, when the vehicle is accelerated, drive each of the wheels (the front wheels 2L and 2R in FIG. 1), and, when the vehicle is decelerated or braked, acquire the braking force while collecting (regeneration) motion energy at this time as power with use of an inertial force due to a rotation of each of the wheels, by controlling the driving motor 23 via, for example, an inverter.

Then, an input side of the third ECU 24 is connected to the accelerator operation sensor 22 and the vehicle data bus 16. An output side of the third ECU 24 is connected to the driving motor 23 and the vehicle data bus 16. The third ECU 24 controls the driving motor 23 according to the accelerator pedal operation amount. Acceleration/deceleration control including the control of the driving motor 23 will be described in detail below.

A mode switching switch 25 as a mode switching unit is provided close to the driver's seat. The mode switching switch 25 serves as a mode switching portion 34 (refer to FIG. 2), which will be described below. The mode switching switch 25 is a switch for switching the running mode of the vehicle to any one of the one-pedal mode and the normal mode, and outputs a mode switching signal M by being subjected to a switching operation by the driver. The normal mode is the mode of performing the acceleration control in response to the operation on the accelerator pedal 21 and also performing the deceleration control in response to the operation on the brake pedal 6. On the other hand, the one-pedal mode is the mode of performing both the acceleration control and the deceleration control in response to the operation on the accelerator pedal 21, i.e., a mode of realizing operations from acceleration to deceleration and even a stop of the vehicle according to the operation amount of the accelerator pedal 21 (an opening degree of the accelerator).

The one-pedal mode is not limited to the configuration that accelerates, decelerates, and stops the vehicle in response to the operation on the accelerator pedal 21, and the vehicle may be configured to accelerate, decelerate, and stop the vehicle in response to, for example, the operation on the brake pedal 6. Further, the switching between the one-pedal mode and the normal mode is not limited to the configuration that switches them with use of the mode switching switch 25 serving as a switch for activating/ending the one-pedal mode, and the vehicle may be configured to allow the one-pedal mode to be selected with use of, for example, a shift lever (a selection lever). More specifically, the vehicle may be configured in such a manner that a position for selecting the one-pedal mode is provided as a selection position of the shift lever in addition to P (parking), N (neutral), D (drive), R (reverse), and the like.

The acceleration/deceleration control apparatus discussed in PTL 1 includes the filter portion that prevents or reduces (blunts) the change in the target acceleration/deceleration to prevent the sudden change in the characteristic of the vehicle when the running mode is switched between the one-pedal mode and the normal mode. More specifically, the configuration discussed in PTL 1 is configured to, in a case where a characteristic of an acceleration instruction or a deceleration instruction with respect to the pedal operation is different between the characteristic for the one-pedal mode and the characteristic for the normal mode, smoothly resolve the difference therebetween with the aid of filter processing performed by the filter portion when the mode is switched.

On the other hand, in a case where, in the one-pedal mode, for example, the accelerator pedal is used as one of pedals for use in the acceleration/deceleration control in the one-pedal mode and the brake pedal is used as the other of pedals for performing only the deceleration control without being used for the accelerator/deceleration control in the one-pedal mode, one possible configuration in this case is to realize the deceleration instruction according to both the pedal brake operation and the accelerator pedal operation in the following manner. That is, one possible configuration is to, in the one-pedal mode, switch the characteristic of the deceleration instruction in response to the brake pedal operation, which is the other of pedals, from a normally used characteristic (a characteristic at the time of normal brake) to a characteristic at the time of the one-pedal mode (a characteristic at the time of automatic brake), and add a deceleration instruction value according to this switched characteristic and a deceleration instruction value (an automatic brake instruction) based on the accelerator pedal operation, which is the one of pedals, to thereby acquire a deceleration instruction as the entire vehicle (a target deceleration instruction).

However, in the case of this configuration, for example, the deceleration may suddenly change when the mode is switched while the brake pedal is being operated. On the other hand, one possible method for preventing or reducing the sudden change in the deceleration in this configuration is to perform the filter processing discussed in PTL 1. However, in this case, the deceleration may reduce despite the unchanged operation amount of the brake pedal. These phenomena may also occur (the acceleration may suddenly change or reduce) in a case where the brake pedal is used as the one of pedals for use in the acceleration/deceleration control in the one-pedal mode and the accelerator pedal is used as the other of pedals for performing only the accelerator control without being used for the acceleration/deceleration control in the one-pedal mode.

In other words, the one possible configuration is to add an instruction value according to a non-one-pedal acceleration instruction characteristic or a non-one-pedal deceleration instruction characteristic to a one-pedal acceleration/deceleration instruction value in response to the one of pedals for use in the acceleration/deceleration control in the one-pedal mode, when the non-one-pedal acceleration instruction characteristic or the non-one-pedal deceleration instruction characteristic in response to the operation on the other of pedals for performing only any one of the acceleration control and the deceleration control without being used for the acceleration/deceleration control in the one-pedal mode is different between the characteristic at the time of the one-pedal mode and the characteristic at the time of the normal mode, and the running mode is the one-pedal mode. In the case of this configuration, the acceleration or the deceleration may suddenly change according to a change in the non-one-pedal acceleration instruction characteristic or the non-one-pedal deceleration instruction characteristic when the mode is switched while the other of pedals not used for the acceleration/deceleration control in the one-pedal mode is being operated.

Further, the one possible method for preventing or reducing this sudden change is to employ the filter processing discussed in PTL 1. More specifically, one possible configuration therefor is to resolve the difference in the instruction value between before and after the mode is switched by the filter processing when the mode is switched while the other of pedals not used for the acceleration/deceleration control in the one-pedal mode is being operated. In the case of this configuration, if the accelerator pedal is used as the other of pedals not used for the acceleration/deceleration control in the one-pedal mode that is being operated when the mode is switched, when a difference is generated in the instruction value in a direction for reducing the acceleration, the acceleration may reduce even when the pedal operation amount is not changed by resolving this difference. On the other hand, if the brake pedal is used as the other of pedals not used for the acceleration/deceleration control in the one-pedal mode that is being operated when the mode is switched, when a difference is generated in the instruction value in a direction for reducing the deceleration, the deceleration may reduce even when the pedal operation amount is not changed by resolving this difference. As a result, the vehicle may cause the driver to feel uncomfortable.

In the following description, these problems will be described with reference to drawings illustrating characteristic lines (timing charts) according to a comparative example illustrated in FIGS. 25 to 28. Hereinafter, the one-pedal mode will be described assuming that the acceleration/deceleration (the target acceleration/deceleration instruction) of the vehicle is realized by the following operations (1) to (3) in this mode, for convenience.
(1) The one-pedal acceleration/deceleration instruction value for performing both the acceleration control and the deceleration control is calculated in response to the operation on the accelerator pedal, which is the one of pedals. (2) The non-one-pedal deceleration instruction value for performing only the deceleration control is calculated in response to the operation on the brake pedal, which is the other of pedals. (3) A result of adding the non-one-pedal deceleration instruction value and the one-pedal acceleration/deceleration instruction value is realized as the acceleration/deceleration (the target acceleration/deceleration instruction) of the vehicle.

Now, FIG. 29 illustrates acceleration instruction value characteristics in the normal mode and the one-pedal mode according to the accelerator pedal operation amount. FIG. 30 illustrates acceleration instruction value characteristics in the normal mode and the one-pedal mode according to the brake pedal operation amount. These drawings, FIGS. 29 and 30 indicate the acceleration and the deceleration as a positive direction and a negative direction of a vertical axis, respectively. In other words, an acceleration having a negative value corresponds to a deceleration having a positive value (a negative acceleration instruction value corresponds to a positive deceleration instruction value). Therefore, in the following description, for example, the term "acceleration" may be used as an acceleration also including a deceleration (=the acceleration/deceleration) when, for example, emphasis on the deceleration is not necessary. Further, contrary thereto, the term "acceleration" may be used as a positive acceleration (an acceleration not including a deceleration).

FIGS. 25 to 28 illustrate changes in each of the operation amounts and each of the instruction values over time between before and after the mode is switched according to the comparison example. The instruction value characteristics illustrated in FIGS. 29 and 30 are used as the acceleration instruction characteristics with respect to the operations on the accelerator pedal and the brake pedal.

First, FIGS. 25 and 26 illustrate the changes in a case where the running mode is switched from the normal mode to the one-pedal mode at time t1 while the brake pedal is being operated by an operation amount Xb1 without the accelerator pedal operated (Xa=0) in the normal mode. As illustrated in FIG. 29, the acceleration instruction value in the normal mode is An(0) and the acceleration instruction value in the one-pedal mode is A1(0) when the accelerator pedal operation amount is zero. As illustrated in FIG. 30, the acceleration instruction value in the normal mode is Bn(Xb1) and the acceleration instruction value in the one-pedal mode is B1(Xb1) when the brake pedal operation amount is Xb1. The instruction value is different between the normal mode and the one-pedal mode from each other with respect to both the accelerator pedal and the brake pedal.

Therefore, as illustrated in FIG. 25, in a case where the acceleration instruction value to be realized as the vehicle (the target acceleration/deceleration instruction as the entire vehicle) is calculated by adding a one-pedal acceleration instruction value A(Xa) and a non-one-pedal acceleration instruction value B(Xb), this acceleration instruction value becomes discontinuous and the deceleration suddenly changes. On the other hand, PTL 1 discusses the technique for smoothly resolving this difference by the filter processing in the case where the instruction value is different in this manner. However, in this case, as illustrated in FIG. 26, the deceleration reduces depending on the instruction value around when the mode is switched. This means that the deceleration changes and reduces while the brake pedal is being operated despite the unchanged (constant) operation amount thereof, and therefore may cause the driver to feel uncomfortable.

Next, FIGS. 27 and 28 illustrate the changes in a case where the running mode is switched from the one-pedal mode to the normal mode at time t2 while the brake pedal, which is the other of pedals, is being operated by the operation amount Xb1 without the accelerator pedal, which is the one of pedals, operated (Xa=0) in the one-pedal mode. In this case, the instruction value is also different with respect to each of the accelerator pedal and the brake pedal, as the acceleration instruction values in the normal mode and the one-pedal mode are An(0) and A3(0), respectively, and the acceleration instruction values in the normal mode and the one-pedal mode are Bn(Xb1) and B1(Xb1) when the brake pedal operation amount is Xb1, respectively.

Therefore, as illustrated in FIG. 27, in the case where the acceleration instruction value to be realized as the vehicle is calculated by adding the one-pedal acceleration instruction value A(Xa) and the non-one-pedal acceleration instruction value B(Xb), this acceleration instruction value becomes discontinuous and the deceleration suddenly changes. On the other hand, PTL 1 discusses the technique for smoothly resolving this difference by the filter processing in the case where the instruction value is different in this manner. However, in this case, as illustrated in FIG. 28, the deceleration also reduces depending on the instruction value around when the mode is switched. This means that the deceleration changes and reduces while the brake pedal is being operated despite the unchanged (constant) operation amount thereof, and therefore may cause the driver to feel uncomfortable.

On the other hand, the embodiment of the present invention prevent or reduce the possibility of causing the driver to feel uncomfortable by including the following functions (A) to (C).

(A) The accretion/deceleration control apparatus switches the characteristic of the non-one-pedal acceleration instruction value or the non-one-pedal deceleration instruction value calculated according to the operation amount on the other of pedals for performing only any one of the acceleration control and the deceleration control in the one-pedal mode by switching the mode with use of the mode switching switch 25 (the mode switching portion 34). In other words, the characteristic of the non-one-pedal deceleration instruction value calculated according to the operation amount on the brake pedal 6, which is the other of pedals, is different between the characteristic at the time or the one-pedal mode and the characteristic at the time of the normal mode, and this characteristic is switched according to the mode switching.

(B) In the one-pedal mode, the accretion/deceleration control apparatus sets the result of adding the non-one-pedal deceleration instruction value calculated according to the operation on the other of pedals to the one-pedal acceleration/deceleration instruction value calculated according to the operation on the one of pedals for performing both the acceleration control and the deceleration control as the target acceleration/deceleration instruction of the vehicle. In other words, in the one-pedal mode, the accretion/deceleration control apparatus adds the one-pedal acceleration/deceleration instruction value calculated according to the operation amount of the accelerator pedal 21, which is the one of pedals, and the non-one-pedal deceleration instruction value calculated according to the operation amount of the brake pedal 6, which is the other of pedals, and sets the result of this addition (a sum) as the target acceleration/deceleration instruction of the vehicle.

(C) The accretion/deceleration control apparatus switches the instruction value characteristic so as to prevent the acceleration from suddenly changing or reducing if the other of pedals in the one-pedal mode that is being operated is the accelerator pedal and the deceleration from suddenly changing or reducing if the other of pedals in the one-pedal mode that is being operated is the brake pedal independently of the pedal operation, in the case where the mode is switched with use of the mode switching switch 25 (the mode switching portion 34) while the other of pedals tor performing only any one of the acceleration control and the deceleration control in the one-pedal mode is being operated. In other words, the accretion/deceleration control apparatus switches the instruction value characteristic so as to prevent the deceleration from suddenly changing or reducing independently of the pedal operation, in the case where the mode is switched while the brake pedal 6, which is the other of pedals, is being operated. More specifically, in the case where the mode is switched while the brake pedal 6, which is the other of pedals, is being operated, the accretion/deceleration control apparatus operates so as to first maintain the deceleration before the mode is switched, and, after that, switch the deceleration instruction value characteristic (end the switching) when the instruction in response to the operation on the other of pedals (the non-one-pedal deceleration instruction value) or the result of adding the instruction in response to the operation on the other of pedals and the instruction in response to the operation on the accelerator pedal, which is the one of pedals (the one-pedal acceleration/deceleration instruction value), exceeds or matches the instruction after the mode is switched.

Figure 14:
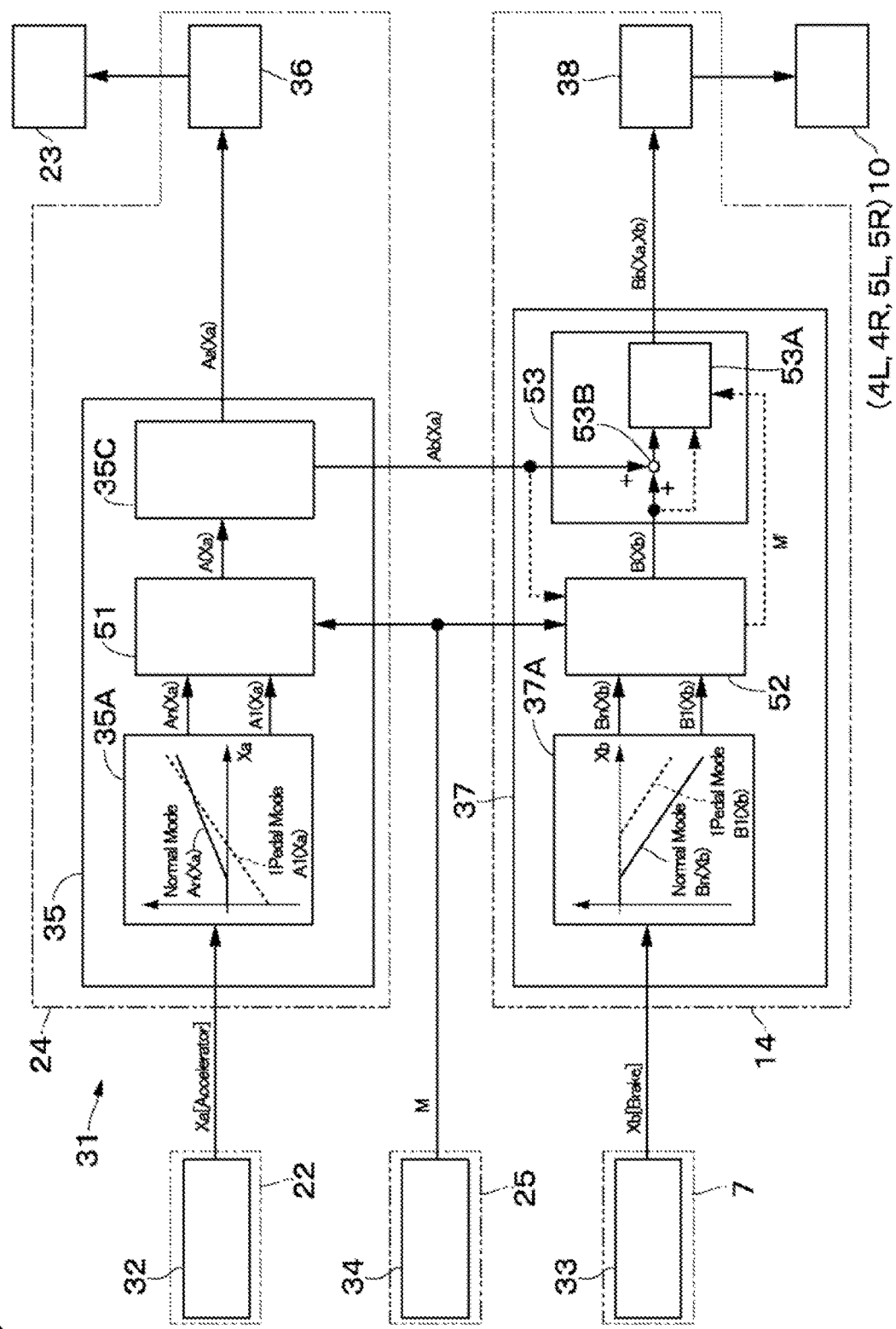
FIG. 14 is a block diagram illustrating an acceleration/deceleration control apparatus according to a third embodiment.
Figure 19:
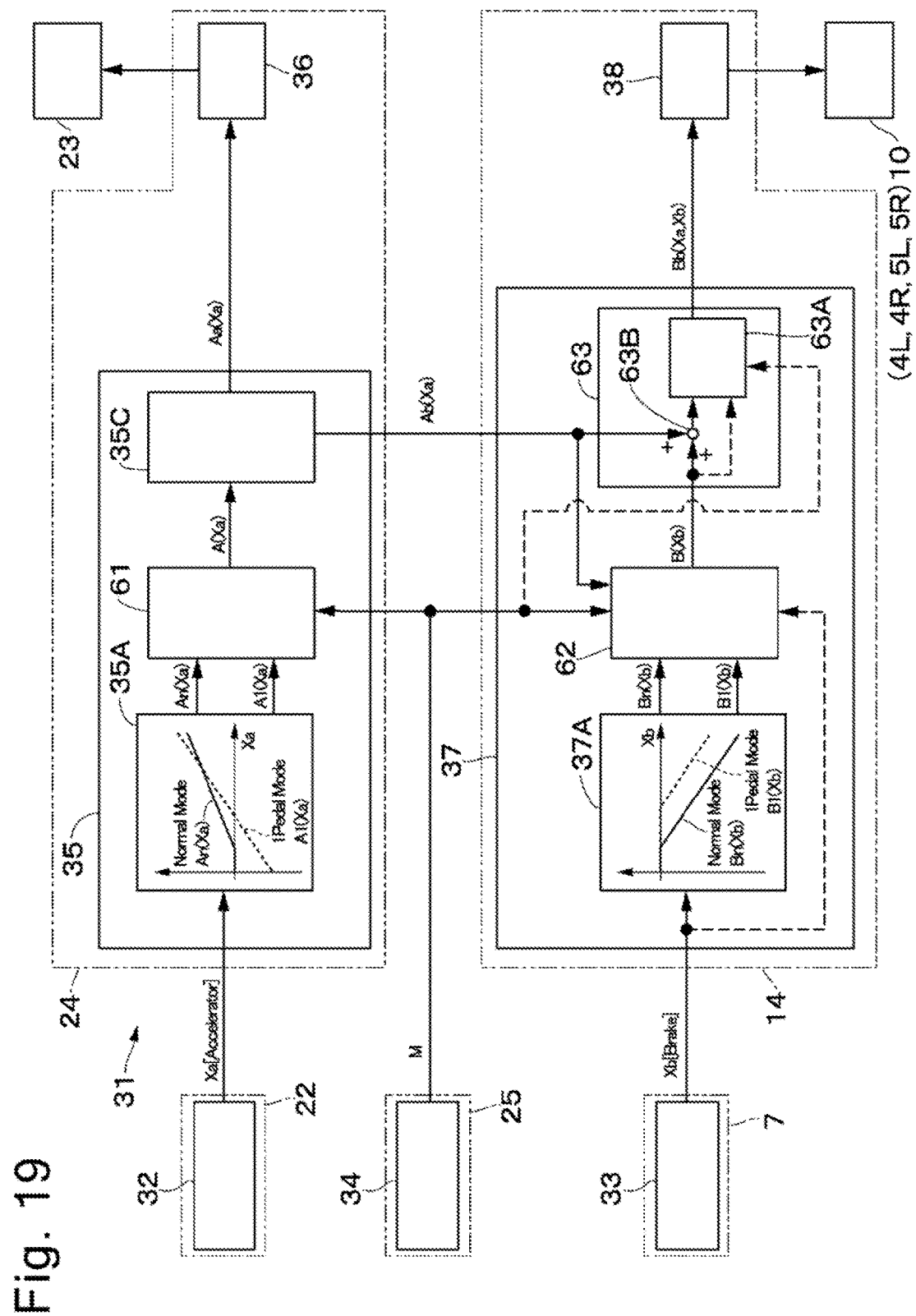
FIG. 19 is a block diagram illustrating an acceleration/deceleration control apparatus according to a fourth embodiment.

A configuration including such functions (A) to (C) will be described with reference to FIGS. 2 to 7. The block diagram illustrated in FIG. 2 indicates an output/input line (a signal line) different from other embodiments by a broken line and an output/input line (a signal line) in common with the other embodiments by a solid line to make differences between the present embodiment (the first embodiment) and the other embodiments (second to fourth embodiments) easily understandable. The same also applies to block diagrams of the other embodiments (FIGS. 8, 14, and 19).

Figure 2:
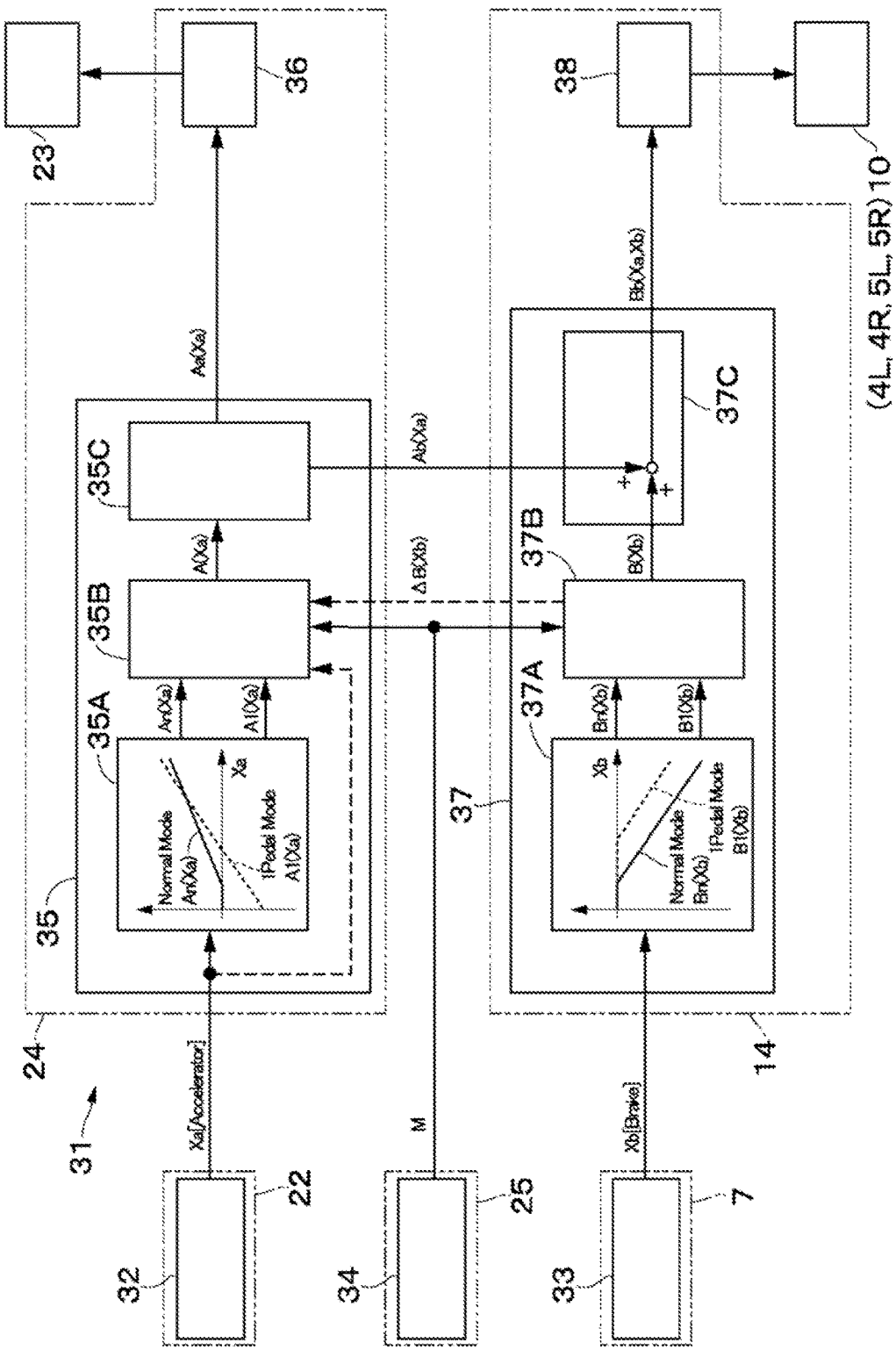
FIG. 2 is a block diagram illustrating the acceleration/deceleration control apparatus according to the first embodiment.

In FIG. 2, an acceleration/deceleration control apparatus 31 according to the first embodiment is a control apparatus (a running control apparatus) for a vehicle system having the one-pedal mode and the normal mode. The acceleration/deceleration control apparatus 31 includes an accelerator pedal operation amount detection portion 32, a brake pedal operation amount detection portion 33, the mode switching portion 34 as the mode switching unit, a driving instruction calculation portion 35, a driving force control portion 36, a braking instruction calculation portion 37, and a braking force control portion 38.

In this case, for example, the accelerator pedal operation amount detection portion 32, the brake pedal operation amount detection portion 33, and the mode switching portion 34 correspond to the accelerator operation sensor 22, the brake operation sensor 7, and the mode switching switch 25 illustrated in FIG. 1, respectively. Further, for example, the driving instruction calculation portion 35 and the driving force control portion 36 correspond to the third ECU 24, and the braking instruction calculation portion 37 and the braking force control portion 38 correspond to the first ECU 14. However, which control unit is used to implement the function of each of the portions 32 to 38 thereon is not limited to this example, and can be changed as appropriate according to the vehicle on which the acceleration/deceleration control apparatus 31 is mounted, such as implementing the function of the driving instruction calculation portion 35 on the first ECU 14.

The accelerator pedal operation amount detection portion 32 functions to detect the operation amount of the accelerator pedal 21 that the driver operates, and outputs it to the driving instruction calculation portion 35 as an accelerator pedal operation amount Xa. More specifically, the accelerator pedal operation amount Xa is output to a one-pedal acceleration instruction value calculation portion 35A and a one-pedal instruction switching portion 35B of the driving instruction calculation portion 35. The brake pedal operation amount detection portion 33 functions to detect the operation amount of the brake pedal 6 that the driver operates, and outputs it to the braking instruction calculation portion 37 as a brake pedal operation amount Xb. More specifically, the brake pedal operation amount Xb is output to a non-one-pedal acceleration instruction value calculation portion 37A of the braking instruction calculation portion 37.

The accelerator pedal operation amount detection portion 32 detects, for example, the pedal stroke amount corresponding to the displacement amount (the stroke amount) of the accelerator pedal 21 as the pedal operation amount (the accelerator operation amount). The pedal operation amount is not limited to the pedal stroke, and the accelerator pedal operation amount detection portion 32 may be configured to detect, for example, the force pressing the accelerator pedal 21 (the pedal pressing force) or the rotational amount (the rotational angle) of the accelerator pedal 21. Further, the detection of the pedal operation amount is not limited to the configuration that directly detects the operation amount of the accelerator pedal 21, and the accelerator pedal operation, amount detection portion 32 may be configured to indirectly detect the operation amount of the accelerator pedal 21, such as detecting a displacement or the like of a member correlating to the operation amount of the accelerator pedal 21. The same also applies to the brake pedal operation amount detection portion 33 except for the difference between the accelerator pedal 21 and the brake pedal 6.

The mode switching portion 34 functions to switch the one-pedal mode or the normal mode according to the switching operation performed by the occupant of the vehicle (more specifically, the driver). The mode switching portion 34 outputs a mode switching signal M corresponding to the currently selected mode. For example, the mode switching portion 34 outputs a mode switching signal Mn indicating that the normal mode is selected if the mode switching switch 25 is operated by being switched to the normal mode, and a mode switching signal M1 indicating that the one-pedal mode is selected if the mode switching switch 25 is operated by being switched to the one-pedal mode. The mode switching signal M is output from the mode switching portion 34 to the driving instruction calculation portion 35, more specifically, the one-pedal instruction switching portion 35B, and the braking instruction calculation portion 37, more specifically, a non-one-pedal instruction switching portion 37B.

The accelerator pedal operation amount Xa detected by the accelerator pedal operation amount detection portion 32 and the mode switching signal M switched by the mode switching portion 34 are input to the driving instruction calculation portion 35. Further, a non-one-pedal acceleration instruction value difference ΔB(Xb) is also input from the non-one-pedal instruction switching portion 37B of the braking instruction calculation portion 37 to the driving instruction calculation portion 35. The driving instruction calculation portion 35 calculates a driving acceleration instruction value Aa(Xa) for accelerating the vehicle and a braking one-pedal accelerator instruction value Ab(Xa) for decelerating the vehicle based on the accelerator pedal operation amount Xa and the mode switching signal M. When calculating them, the driving instruction calculation portion 35 also calculates them based on the non-one-pedal acceleration instruction value difference ΔB(Xb) as necessary. The driving acceleration instruction value Aa(Xa) is output to the driving force control portion 36, and the braking one-pedal acceleration instruction value Ab(Xa) is output to the non-one-pedal instruction switching portion 37B of the braking instruction calculation portion 37.

The driving acceleration instruction value Aa(Xa) is input from the driving instruction calculation portion 35, more specifically, a braking/driving distribution portion 35C to the driving force control portion 36. The driving force control portion 36 performs control so as to drive the vehicle by outputting a driving instruction to the driving motor 23 (the inverter thereof) serving as the driving apparatus according to the driving acceleration instruction value Aa(Xa) calculated by the driving instruction calculation portion 35. Actually, this driving instruction is output to the not-illustrated inverter of the driving motor 23.

The brake pedal operation amount Xb detected by the brake pedal operation amount detection portion 33, the mode switching signal M switched by the mode switching portion 34, and the braking one-pedal acceleration instruction value Ab(Xa) calculated by the braking/driving distribution portion 35C of the driving instruction calculation portion 35 are input to the braking instruction calculation portion 37. The braking instruction calculation portion 37 calculates a braking acceleration instruction value Bb (Xa, Xb) serving as the deceleration instruction value for decelerating the vehicle based on the brake pedal operation amount Xb, the mode switching signal M, and the braking one-pedal acceleration instruction value Ab(Xa). Further, the braking instruction calculation portion 37 also calculates the non-one-pedal acceleration instruction value difference ΔB(Xb) for preventing or reducing the sudden change in the deceleration when the mode is switched based on the brake pedal operation amount AX. The braking acceleration instruction value Bb(Xa, Xb) serving as the deceleration instruction value is output to the braking force control portion 38, and the non-one-pedal acceleration instruction value difference ΔB(Xb) is output to the one-pedal instruction switching portion 35B of the driving instruction calculation portion 35.

The braking acceleration instruction value Bb(Xa, Xb) is input from the braking instruction calculation portion 37, more specifically, a one-pedal instruction addition portion 37C to the braking force control portion 38. The braking force control portion 38 performs control so as to brake the vehicle by outputting a braking instruction to the electric motor 10B of the electric booster 10 serving as the braking apparatus to adjust the pressures in the wheel cylinders 4L, 4R, 5L, and 5R (the wheel cylinder pressures) according to the braking acceleration instruction value Bb(Xa, Xb) calculated by the braking instruction calculation portion 37. In the present embodiment, the braking instruction is output as a driving current supplied to the electric motor 10B.

The method for controlling the braking force by the braking force control portion 38, especially, the method for controlling the braking force (an automatic brake amount) in response to the operation on the accelerator pedal 21 when the one-pedal mode is selected is not limited to the control of the master cylinder pressure, which is the brake pressure generated by the electric booster 10. This method can be realized by various kinds of methods for controlling the braking force including known techniques, such as a method that controls the regenerative torque of the driving motor 23, a method that controls the wheel cylinder pressure, which is the brake pressure generated by the ESC 12, a method that controls the braking force by an electric parking brake if the brake mechanism is equipped with the electric parking brake, and a method that controls a braking force of an electric brake if the brake mechanism is the electric brake.

Further, in a case where the braking force is provided with use of a plurality of braking apparatuses, such as the electric booster 10, the ESC 12, and the driving motor 23, the braking force control portion 38 distributes the braking force to be provided by each of the braking apparatuses so as to provide the braking force in cooperation among respective electric actuators. In this case, the braking force control portion 38 outputs a braking instruction corresponding to the distributed braking force to each of the braking apparatus.

Next, the driving instruction calculation portion 35 and the braking instruction calculation portion 37 will be described.

The driving instruction calculation portion 35 includes the one-pedal acceleration instruction value calculation portion 35A, the one-pedal instruction switching portion 35B, and the braking/driving distribution portion 35C. The one-pedal acceleration instruction value calculation portion 35A calculates an acceleration instruction value An(Xa) at the time of the normal mode (for the normal mode) and an acceleration instruction value A1(Xa) at the time of the one-pedal mode (for the one-pedal mode) based on the accelerator pedal operation amount Xa from the accelerator pedal operation amount detection portion 32. The acceleration instruction values An(Xa) and A1(Xa) calculated by the one-pedal acceleration instruction value calculation portion 35A are output to the one-pedal instruction switching portion 35B.

The one-pedal instruction switching portion 35B selects any of the acceleration instruction values An(Xa) and A1(Xa) calculated by the one-pedal acceleration instruction value calculation portion 35A according to the mode switching signal M from the mode switching portion 34, and calculates the one-pedal acceleration instruction value A(Xa). The one-pedal acceleration instruction value A(Xa) calculated by the one-pedal instruction switching portion 35B is output to the braking/driving distribution portion 35C. The calculation of the one-pedal acceleration instruction value A(Xa) by the one-pedal instruction switching portion 35B will be described below.

The braking/driving distribution portion 35C distributes the one-pedal acceleration instruction value A(Xa) calculated by the one-pedal instruction switching portion 35B into the driving acceleration instruction value Aa(Xa) and the braking one-pedal acceleration instruction value Ab(Xa). The braking/driving distribution portion 35C, for example, outputs the one-pedal acceleration instruction value A(Xa) to the driving force control portion 36 as the driving acceleration instruction value Aa(Xa) if the one-pedal acceleration instruction value A(Xa) is a positive value (the acceleration instruction value), and outputs the one-pedal acceleration instruction value A(Xa) to the braking instruction calculation portion 37 (the one-pedal instruction addition portion 37C thereof) as the braking one-pedal acceleration instruction value Ab(Xa) if the one-pedal acceleration instruction value A(Xa) is a negative value (the deceleration instruction value).

On the other hand, the braking instruction calculation portion 37 includes the non-one-pedal acceleration instruction value calculation portion 37A, the non-one-pedal instruction switching portion 37B, and the one-pedal instruction addition portion 37C. The non-one-pedal acceleration instruction value calculation portion 37A calculates an acceleration instruction value Bn(Xb) at the time of the normal mode and an acceleration instruction value B1(Xb) at the time of the one-pedal mode based on the brake pedal operation amount Xb input from the brake pedal operation amount detection portion 33. The acceleration instruction values Bn(Xb) and B1(Xb) calculated by the non-one-pedal acceleration instruction value calculation portion 37A are output to the non-one-pedal instruction switching portion 37B.

The non-one-pedal instruction switching portion 37B selects any of the acceleration instruction values Bn(Xb) and B1(Xb) calculated by the non-one-pedal acceleration instruction value calculation portion 37A according to the mode switching signal M from the mode switching portion 34, and calculates the non-one-pedal acceleration instruction value B(Xb). Further, the non-one-pedal instruction switching portion 37B also calculates the non-one-pedal acceleration instruction value difference ΔB(Xb) cased on the acceleration instruction values Bn(Xb) and B1(Xb). The non-one-pedal acceleration instruction value B(Xb) and the non-one-pedal acceleration instruction value difference ΔB(Xb) calculated by the non-one-pedal instruction switching portion 37B are output to the one-pedal instruction addition portion 37C and the one-pedal instruction switching portion 35B of the driving instruction calculation portion 35, respectively. The calculation of the non-one-pedal acceleration instruction value B(Xb) and the non-one-pedal acceleration instruction value difference ΔB(Xb) by the non-one-pedal instruction switching portion 37B will be described below.

The one-pedal instruction addition portion 37C adds the non-one-pedal acceleration instruction value B(Xb) calculated by the non-one-pedal instruction switching portion 37B and the bracing one-pedal acceleration instruction value Ab(Xa) output from the braking/driving distribution portion 35C, thereby calculating the braking acceleration instruction value Bb(Xa, Xb). The one-pedal instruction addition portion 37C outputs the braking acceleration instruction value Bb(Xa, Xb) to the braking force control portion 38.

Now, in the one-pedal acceleration instruction value calculation portion 35A of the driving instruction calculation portion 35, the characteristic of the acceleration instruction value An(Xa) at the time of the normal mode indicates the characteristic of the acceleration instruction value for driving the vehicle with respect to the accelerator pedal operation amount Xa. For example, as illustrated in FIG. 29, the characteristic of the acceleration instruction value An(Xa) at the time of the normal mode is generally characterized in that the speed or the acceleration monotonously increases according to an increase in the accelerator pedal operation amount Xa, and a method for setting it is known to those skilled in the art and therefore will not be described in detail herein.

On the other hand, the acceleration instruction value A1(Xa) at the time of the one-pedal mode is set so as to allow the deceleration of the vehicle to be controlled in a region where the accelerator pedal operation amount Xa is small and the acceleration of the vehicle to be controlled in a region where the operation amount is large. FIG. 29 indicates the acceleration instruction value A1(Xa) at the time of the one-pedal mode as a characteristic changing linearly with respect to the accelerator pedal operation amount Xa for sake of simplicity. However, this characteristic may be set in any manner, and may be any characteristic as long as the acceleration monotonously increases from a region where the acceleration reaches a negative value according to the pedal operation amount. Further, this characteristic may be set to such a characteristic that there is a dead band in a region where the acceleration instruction transitions across zero. Further, a physical amount of this instruction value neither has to be the acceleration, and may be, for example, the driving torque or the driving force for driving the vehicle.

On the other hand, in the non-one-pedal acceleration instruction value calculation portion 37A of the braking instruction calculation portion 37, the acceleration instruction value Bn(Xb) at the time of the normal mode indicates the characteristic of the deceleration instruction value or the negative acceleration instruction value, which is the braking instruction value for braking the vehicle, with respect to the brake pedal operation amount Xb. For example, as illustrated in FIG. 30, the characteristic of the acceleration instruction value Bn(Xb) at the time of the normal mode is generally characterized in that the acceleration instruction value Bn(Xb) monotonously reduces, i.e., the acceleration reduces or the deceleration increases according to an increase in the brake pedal operation amount Xb, and a method for setting it is known to those skilled in the art and therefore will not be described in detail herein.

On the other hand, the acceleration instruction value B1(Xb) at the time of the one-pedal mode is a characteristic added to the braking acceleration instruction value Ab(Xa) distributed by the braking/driving distribution portion 35C in the one-pedal mode, and therefore is set in such a manner that the deceleration falls below the acceleration instruction value Bn(Xb) at the time of the normal mode as illustrated in FIG. 30. However, this characteristic does not necessarily have to be set in this manner, and may be any characteristic that monotonously increases with respect to the brake pedal operation amount Xb similarly to the acceleration instruction value Bn(Xb) at the time of the normal mode. Further, physical amounts of these instruction values neither have to be the acceleration, and may be, for example, the brake fluid hydraulic pressure, the braking torque, or the braking force for braking the vehicle, Then, the one-pedal instruction switching portion 35B switches the one-pedal acceleration instruction value characteristic An(Xa) at the time of the normal mode and the one-pedal acceleration instruction value characteristic A1(Xa) at the time or the one-pedal mode according to the mode switching signal M. Further, the non-one-pedal instruction switching portion 37B also switches the non-one-pedal acceleration instruction value characteristic Bn(Xb) at the time of the normal mode and the non-one-pedal acceleration instruction value characteristic B1(Xb) at the time of the one-pedal mode according to the mode switching signal M. In the embodiment, the acceleration instruction value characteristics An(Xa), A1(Xa), Bn(Xb), and B1(Xb) are switched so as to prevent or reduce the change in the deceleration when the mode is switched between the normal mode and the one-pedal mode according to the mode switching signal M.

More specifically, in the first embodiment, the acceleration/deceleration control apparatus 31 outputs such a one-pedal acceleration/deceleration instruction value that the result of adding the non-one-pedal deceleration instruction value for the one-pedal mode and the one-pedal acceleration/deceleration instruction value for the one-pedal mode after the mode is switched matches the non-one-pedal deceleration instruction value for the normal mode before the mode is switched, so as to prevent the deceleration from suddenly changing or reducing, in the case where the mode is switched from the normal mode to the one-pedal mode with use of the mode switching portion 34 while the brake pedal 6 is being operated. In other words, the one-pedal instruction switching portion 35B outputs the one-pedal acceleration instruction value A(Xa) (corrects the one-pedal acceleration instruction value A1(Xa) for the one-pedal mode into A1'(Xa)) in such a manner that the result or adding the non-one-pedal acceleration instruction value B1(Xb) for the one-pedal mode and the one-pedal acceleration instruction value A1(Xa) for the one-pedal mode after the mode is switched matches the non-one-pedal acceleration instruction value Bn(Xb) for the normal mode before the mode is switched. In this manner, when the mode is switched, the acceleration or the deceleration before this mode switching is maintained.

Figure 4:
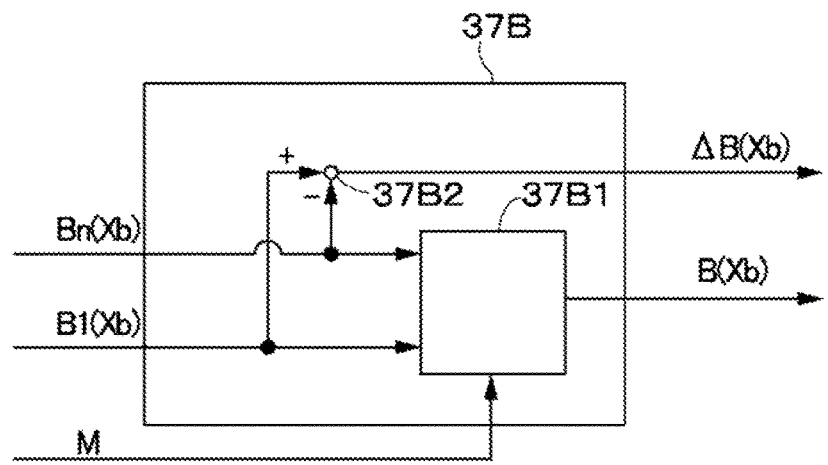
FIG. 4 is a block diagram illustrating a non-one-pedal instruction switching portion illustrated in FIG. 2.

Therefore, as illustrated in FIG. 4, the non-one-pedal instruction switching portion 37B includes a switching switch 37B1. The non-one-pedal acceleration instruction value Bn(Xb) for the normal mode and the non-one-pedal acceleration instruction value B1(Xb) for the one-pedal mode are input to the switching switch 37B1. The switching switch 37B1 selects the non-one-pedal acceleration instruction value Bn(Xb) for the normal mode if the mode switching signal M indicates the normal mode Mn. The switching switch 37B1 selects the non-one-pedal acceleration instruction value B1(Xb) for the one-pedal mode if the mode switching signal M indicates the one-pedal mode M1. The switching switch 37B1 outputs this selected value (a selected instruction value) to the one-pedal instruction addition portion 37C as the non-one-pedal acceleration Instruction value B(Xb).

Further, the non-one-pedal instruction switching portion 37B includes a subtraction portion 37B2, which calculates a difference in the non-one-pedal acceleration instruction value between the normal mode and the one-pedal mode. The subtraction portion 37B2 subtracts the non-one-pedal acceleration instruction value Bn(Xb) for the normal mode from the non-one-pedal acceleration instruction value B1(Xb) for the one-pedal mode, i.e., calculates "B1(Xb)−Bn(Xb)". The subtraction portion 37B2 outputs a value acquired from this subtraction (a difference) to the one-pedal instruction switching portion 35B as the non-one-pedal acceleration instruction value difference ΔB(Xb).

Figure 3:
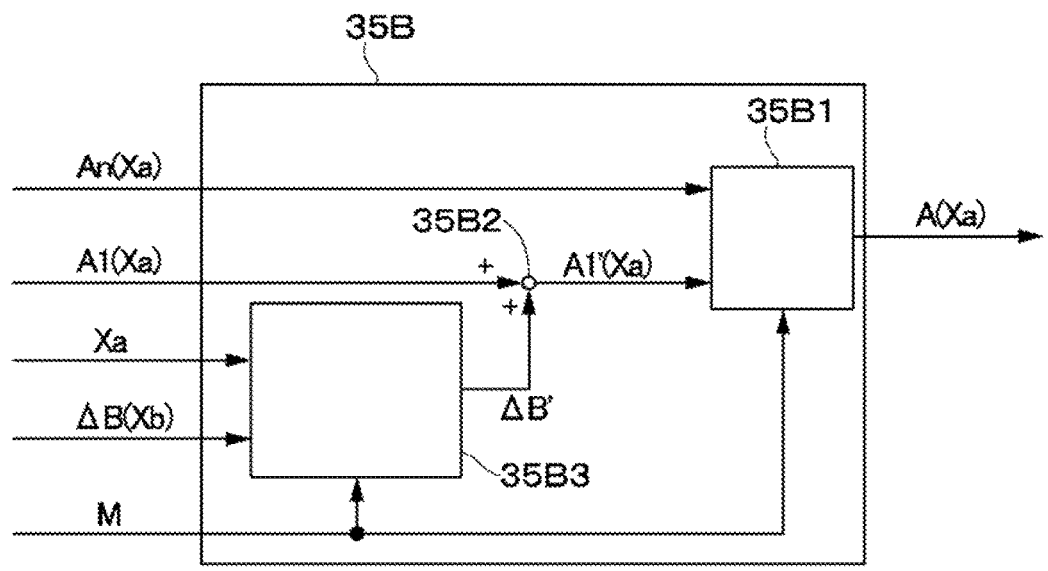
FIG. 3 is a block diagram illustrating a one-pedal instruction switching portion illustrated in FIG. 2.

On the other hand, as illustrated in FIG. 3, the one-pedal instruction switching portion 35B includes a switching switch 35B1. The one-pedal acceleration instruction value An(Xa) for the normal mode and a one-pedal acceleration instruction value A1'(Xa) after application of a measure against the change in the deceleration for the one-pedal mode are input to the switching switch 35B1. The switching switch 35B1 selects the one-pedal acceleration instruction value An(Xa) for the normal mode if the mode switching signal M indicates the normal mode Mn. On the other hand, the switching switch 35B1 selects the one-pedal acceleration instruction value A1'(Xa) after the application of the measure against the change in the deceleration for the one-pedal mode if the mode switching signal M indicates the one-pedal mode M1. The switching switch 35B1 outputs this selected value (a selected instruction value) to the braking/driving distribution portion 35C as the one-pedal acceleration instruction value A(Xa).

Now, the one-pedal acceleration instruction value A1'(Xa) after the application of the measure against the change in the deceleration for the one-pedal mode is a result (a sum) of adding the one-pedal acceleration instruction value A1(Xa) for the one-pedal mode and an acceleration instruction value difference ΔB' for the measure against the change in the deceleration. The acceleration instruction value difference ΔB' for the measure against the orange in the deceleration is calculated by an acceleration instruction value difference calculation portion 35B3 for the measure against the change in the deceleration.

For this purpose, the one-pedal instruction switching portion 35B includes an addition portion 35B2 and the acceleration instruction value difference calculation portion 35B3 for the measure against the change in the deceleration. The addition portion 35B2 adds the one-pedal acceleration instruction value A1(Xa) for the one-pedal mode and the acceleration instruction value difference ΔB' for the measure against the change in the deceleration, and outputs a value acquired from this addition (a sum) to the switching switch 35B1 as vine one-pedal acceleration instruction value A1' (Xa) after the application of the measure against the change in the deceleration for the one-pedal mode.

The mode switching signal M, the non-one-pedal acceleration instruction value difference ΔB(Xb), and the accelerator pedal operation amount Xa are input to the acceleration instruction value difference calculation portion 35B3 for the measure against the change in the deceleration. The acceleration instruction value difference calculation portion 35B3 calculates the acceleration instruction value difference ΔB' for the measure against the change in the deceleration based on the mode switching signal M, the non-one-pedal acceleration instruction value difference ΔB(Xb), and the accelerator pedal operation amount Xa.

Now, the acceleration instruction value difference calculation portion 35B3 holds the non-one-pedal acceleration instruction value difference ΔB(Xb) at the moment that the mode switching signal M indicates the one-pedal mode M1, and sets it as the acceleration instruction value difference ΔB' for the measure against the change in the deceleration. This acceleration instruction value difference ΔB' corresponds to a difference between the non-one-pedal acceleration instruction value Bn(Xb) for the normal mode and the non-one-pedal acceleration instruction value B1(Xb) for the one-pedal mode that is generated along with the mode switching by the non-one-pedal instruction switching portion 37B.

Then, the addition portion 35B2 adds this difference ΔB' to the one-pedal acceleration instruction value A1(Xa) for the one-pedal mode. Therefore, the one-pedal acceleration instruction value A1'(Xa) after the application of the measure not the change in the deceleration, which is the one-pedal acceleration instruction value A1(Xa) increased by an amount corresponding to the difference between the non-one-pedal acceleration instruction value Bn(Xb) for the normal mode and the non-one-pedal acceleration instruction value B1(Xb) for the one-pedal mode that is generated along with the mode switching by the non-one-pedal instruction switching portion 37B is input to the switching switch 35B1. Then, this one-pedal acceleration instruction value A1'(Xa) after the application of the measure against the change in the deceleration is set as the one-pedal acceleration instruction value A(Xa), and the value acquired by adding this one-pedal acceleration instruction value A(Xa) and the non-one-pedal acceleration instruction value B(Xb) is set as the acceleration instruction value as the entire vehicle immediately after the mode is switched, i.e., the vehicle acceleration instruction value serving as the target acceleration/deceleration instruction value of the vehicle. As a result, the change in the deceleration when the mode is switched can be prevented or reduced.

However, the one-pedal acceleration instruction value A1'(Xa) after the application of the measure against the change in the deceleration ends up having a difference in the characteristic thereof by an amount corresponding to ΔB' from the one-pedal acceleration instruction value characteristic A1(Xa) for the one-pedal mode for performing the acceleration deceleration control according to the accelerator pedal operation amount Xa in the one-pedal mode. To resolve this difference, for example, the acceleration instruction value difference calculation portion 35B3 for the measure against the change in the deceleration is assumed to be reducing the value of ΔB', i.e., reducing the acceleration according to the increase in the accelerator pedal operation amount Xa so that the one-pedal acceleration instruction value A1'(Xa) approaches the original A1(Xa) characteristic, as illustrated in FIG. 5.

Figure 5:
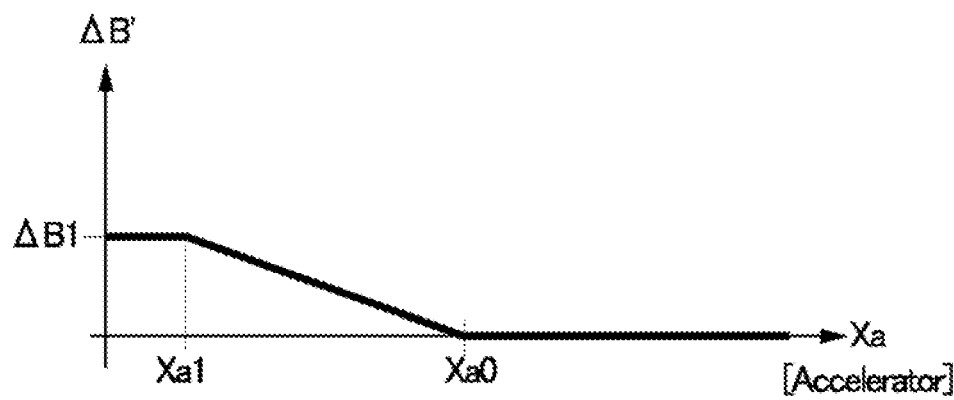
FIG. 5 illustrates a characteristic line indicating one example of an acceleration instruction value difference characteristic for a measure against a change in a deceleration.

FIG. 5 illustrates an example of the characteristic in which the acceleration instruction value difference ΔB' for the measure against the change in the deceleration reduces according to the operation of (the increase in) the accelerator pedal operation amount Xa, in a case where the mode is switched to the one-pedal mode at an accelerator pedal operation amount Xa1 and the non-one-pedal acceleration instruction value difference at this time is ΔB1. In the first embodiment, the characteristic is set in such a manner that ΔB' reduces according to the increase in the accelerator pedal operation amount Xa, and reaches zero at an arbitrary accelerator pedal operation amount Xa0. Further, the characteristic is set in such a manner that the value of ΔB' is maintained when the accelerator pedal operation amount falls below Xa1.

The relationship (characteristic) between the accelerator pedal operation amount Xa and the acceleration instruction value difference ΔB' for the measure against the change in the deceleration is not limited to the characteristic illustrated in FIG. 5. For example, ΔB' may reduce according to the increase or reduction in the accelerator pedal operation amount Xa, starting from the accelerator pedal operation amount Xa at the moment that the mode is switched to the one-pedal mode. Alternatively, ΔB' may reduce according to an elapse of time since the mode is switched. Further, this characteristic neither has to reduce linearly, and may reduce according to any characteristic. Further, the value of ΔB' that has first reduced due to the change in the accelerator pedal operation amount Xa does not have to increase after that. For example, the characteristic may be set in such a manner that the value or ΔB' reduces when the accelerator pedal operation amount increases, is maintained without increasing when the accelerator pedal operation amount reduces, and reduces when the accelerator pedal operation amount increases again, in a case where the driver performs such an operation that the operation amount repeatedly increases and reduces between the accelerator pedal operation amounts Xa1 and Xa0.

Figure 6:
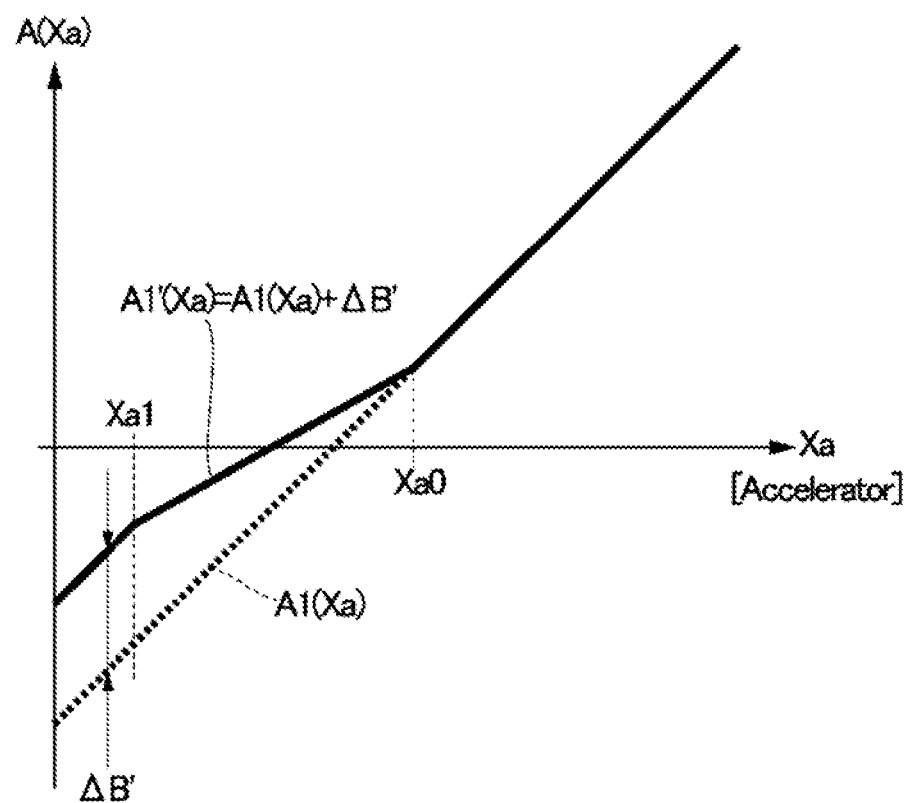
FIG. 6 illustrates a characteristic line indicating one example of a one-pedal acceleration instruction value characteristic after application of the measure against the change in the deceleration with respect to an accelerator pedal operation amount.

FIG. 6 illustrates a characteristic line indicating what kind of characteristic the one-pedal acceleration instruction value characteristic A(Xa) has due to the change in the accelerator pedal operation amount Xa in the case where the acceleration instruction value difference ΔB' for the measure against the change in the deceleration illustrated in FIG. 5 is employed. As illustrated in FIG. 6, this employment resolves ΔB' as the accelerator pedal operation amount Xa increases, allowing the one-pedal acceleration instruction value characteristic A(Xa) to realize the same characteristic as the originally set one-pedal acceleration instruction value characteristic A1(Xa) for the one-pedal mode at an operation amount equal to or larger than the accelerator pedal operation amount Xa0.

Figure 7:
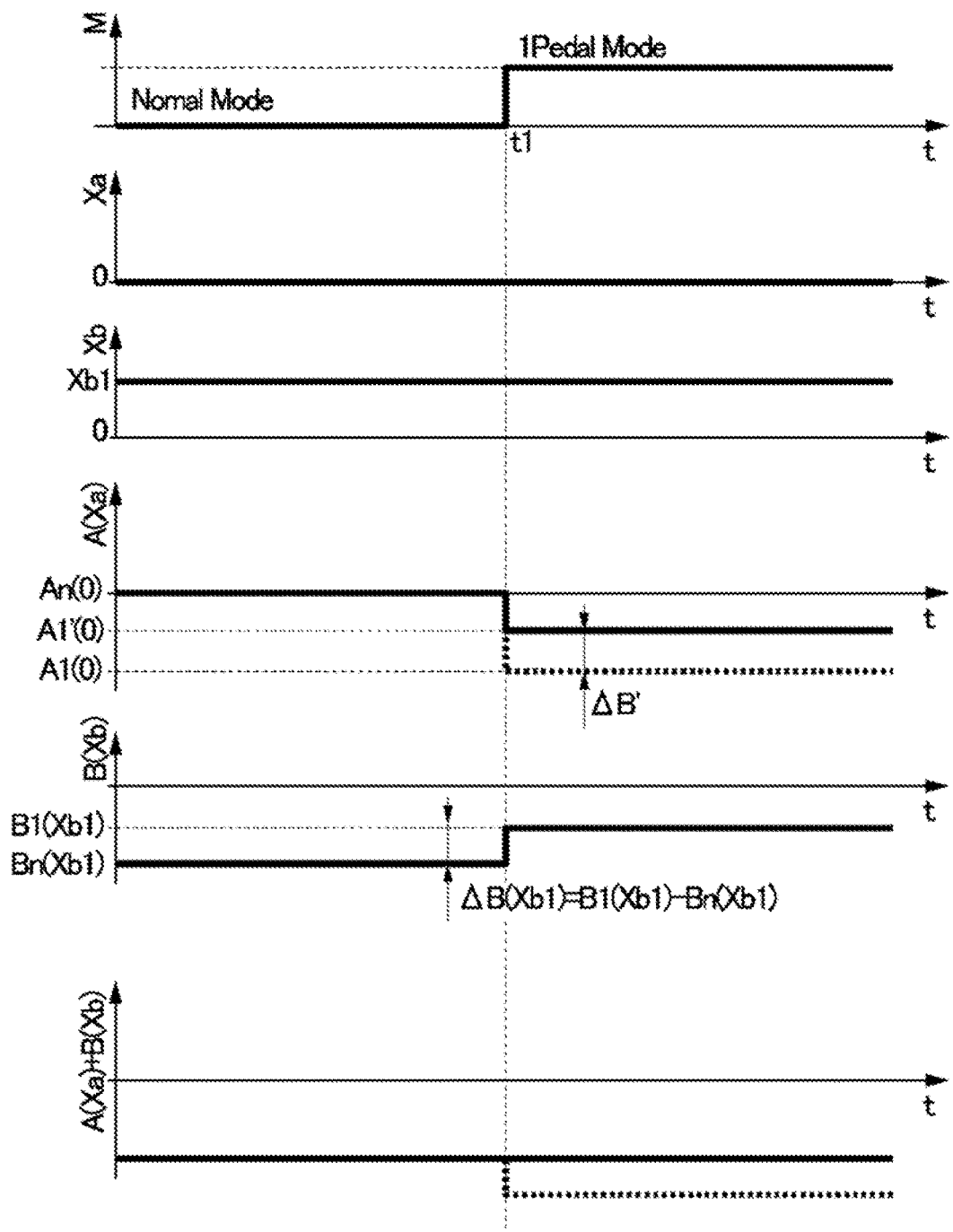
FIG. 7 illustrates characteristic lines indicating one example of changes in each of operation amounts and each of instruction values oven time when a mode is switched from a normal mode to a one-pedal mode.
Figure 8:
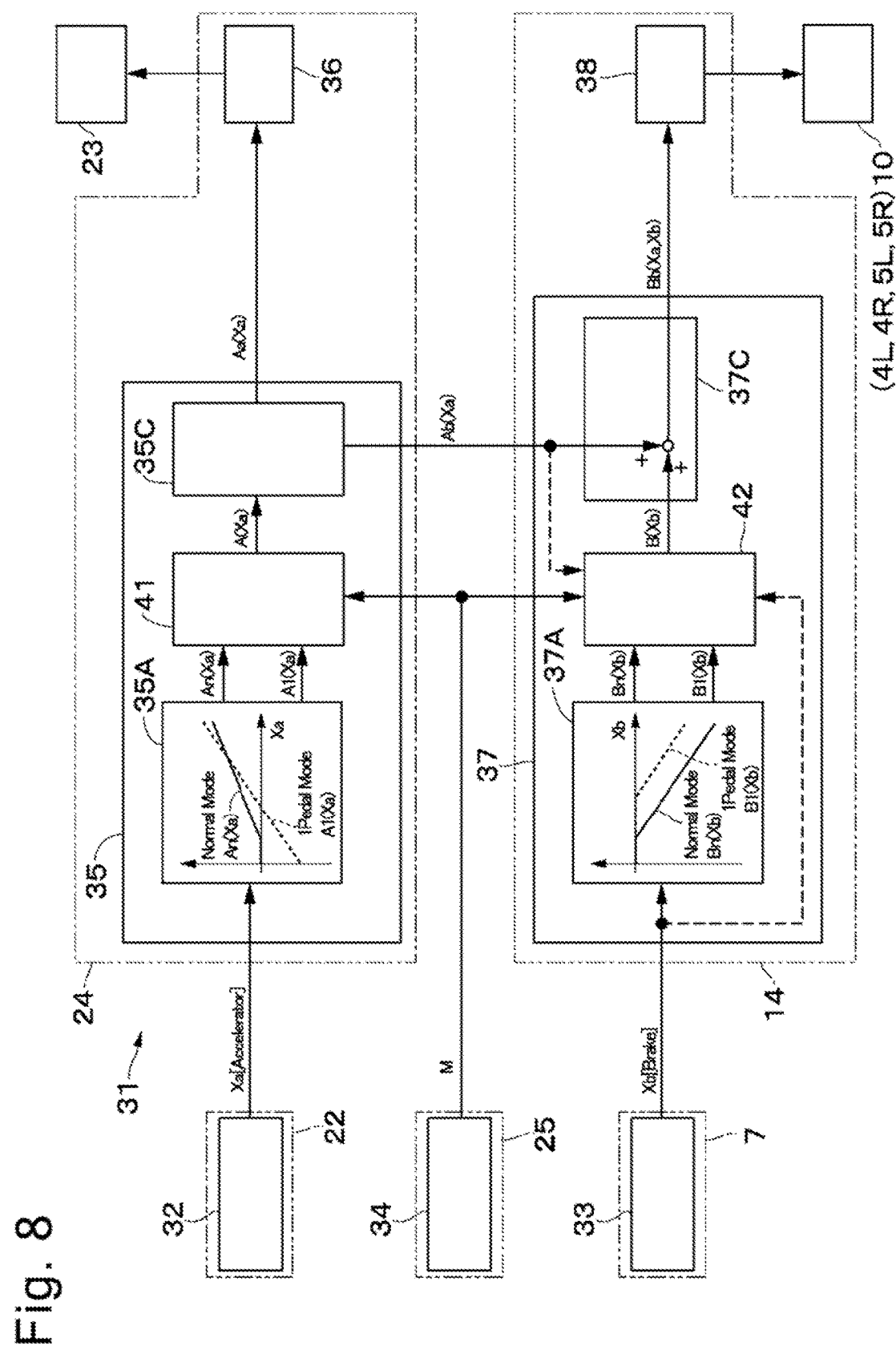
FIG. 8 is a block diagram illustrating an acceleration/deceleration control apparatus according to a second embodiment.

FIG. 7 illustrates characteristic lines (timing charts) indicating changes in each of the operation amounts and each of the instruction values over time when the mode is switched from the normal mode to the one-pedal mode according to the first embodiment.

FIG. 7 illustrates the changes in a case where the mode is switched from the normal mode to the one-pedal mode by the mode switching portion 34 at time t1 while the brake pedal is being operated by the operation amount Xb1 without the accelerator pedal operated (Xa=0) in the normal mode. In this case, according to the switching of the mode, the one-pedal acceleration instruction value characteristic is switched from the solid line to the broken line illustrated in FIG. 29, and the non-one-pedal acceleration instruction value characteristic is switched from the solid line to the broke line illustrated in FIG. 30.

When the mode is switched from the normal mode to the one-pedal mode at time t1, a non-one-pedal acceleration instruction value characteristic difference ΔB (Xb1) when the mode is switched is expressed by the following equation, an equation 1.

$$\Delta B(Xb1) = B1(Xb1) - Bn(Xb1) \qquad \text{[Equation 1]}$$

Then, a difference corresponding to this ΔB(Xb1) is set as ΔB', and A1'(0) acquired by adding this ΔB' to the one-pedal acceleration instruction value A1(0) for the one-pedal mode is calculated as the one-pedal acceleration instruction value A(0). As a result, even when the non-one-pedal acceleration instruction value B(Xb1) is switched from Bn(Xb1) to B1(Xb1) along with the mode switching, a result of adding the non-one-pedal acceleration instruction value B(Xb1) and Ab(0) distributed as the instruction value for the braking is realized as the deceleration of the vehicle. Now, Ab(0) is corrected into A1'(0), and a result of adding this A1'(0) and B(Xb1) matches a result of the addition before the mode is switched, i.e., a result of adding Bn(Xb1) and An(0). Therefore, the acceleration/deceleration control apparatus 31 can prevent or reduce the occurrence of the discontinuity of the deceleration (the vehicle acceleration instruction value) between before and after the mode is switched, thereby succeeding in preventing or cutting down the reduction in the deceleration despite the unchanged brake pedal operation amount.

The acceleration/deceleration control apparatus according to the embodiment has the above-described configuration, and, next, an operation thereof will be described.

When the driver of the vehicle operates the accelerator pedal 21 by pressing it in the Xaccel direction, indicated by the arrow, the accelerator pedal operation amount Xa thereof is input from the accelerator pedal operation amount detection portion 32 (the accelerator operation sensor 22) to the driving instruction calculation portion 35 (the third ECU 24). Further, when the driver of the vehicle operates the brake pedal 6 by pressing it in the Xbrake direction indicated by the arrow, the brake pedal operation amount Xb thereof is input from the brake pedal operation amount detection portion 33 (the brake operation sensor 7) to the braking instruction calculation portion 37 (the first ECU 14).

Now, first, an operation in the case where the normal mode is selected, i.e., the mode switching portion 34 (the mode switching switch 25) is switched to the normal mode by the driver's switching operation will be described. In this case, the one-pedal instruction switching portion 35B (the switching switch 35B1) of the driving instruction calculation portion 35 selects the acceleration instruction value An(Xa) at the time of the normal mode. In other words, the one-pedal acceleration instruction value An(Xa) for the normal mode that is calculated based on the characteristic indicated by the solid line in FIG. 29 is output with respect to the accelerator pedal operation amount Xa from the one-pedal instruction switching portion 35B to the braking/driving distribution portion 35C as the one-pedal acceleration instruction value A(Xa).

In this case, the one-pedal acceleration instruction value A(Xa) has a positive value, and the braking/driving distribution portion 35C outputs this one-pedal acceleration instruction value A(Xa) having the positive value to the driving force control portion 36 as the driving acceleration instruction value Aa(Xa). The driving force control portion 36 outputs the driving instruction for outputting the driving force according to the driving acceleration instruction value Aa(Xa) to the driving motor 23 serving as the driving apparatus. As a result, the driving force can be provided to the vehicle according to the driver's operation on the accelerator pedal 21.

On the other hand, the switching switch 37B1 of the non-one-pedal instruction switching portion 37B of the braking instruction calculation portion 37 selects the acceleration instruction value Bn(Xb) at the time of the normal mode. In other words, the non-one-pedal acceleration instruction value Bn(Xb) for the normal mode that is calculated based on the characteristic indicated by the solid line in FIG. 30 is output with respect to the brake pedal operation amount Xb from the non-one-pedal instruction switching portion 37B to the one-pedal instruction addition portion 37C as the non-one-pedal acceleration instruction value B(Xb).

Now, in the normal mode, the one-pedal acceleration instruction value characteristic An (Xa) does not have a negative value, i.e., is not added as the braking one-pedal acceleration instruction value Ab(Xa) by the one-pedal instruction addition portion 37C. Therefore, the one-pedal instruction addition portion 37C outputs the non-one-pedal acceleration instruction value B(Xb) to the braking force control portion 38 as the braking acceleration instruction value Bb(Xa, Kb). The braking force control portion 38 outputs a braking instruction driving current for providing the braking force according to the braking acceleration instruction value Bb(Xa, Xb) to the electric motor 10B of the electric booster 10 serving as the braking apparatus. As a result, the braking force can be provided to the vehicle according to the driver's operation on the brake pedal 6.

Next, an operation in the case where the one-pedal mode is selected, i.e., the mode switching portion 34 (the mode switching switch 25) is switched to the one-pedal mode by the driver's switching operation will be described. In this case, the switching switch 35B1 of the one-pedal instruction switching portion 35B of the driving instruction calculation portion 35 selects the one-pedal acceleration instruction value A1'(Xa) after the application of the measure against the change in the deceleration. This A1'(Xa), for example, matches the acceleration instruction value A1(Xa) at the time of the one-pedal mode when the acceleration instruction value difference ΔB' for the measure against the change in the deceleration is zero. In other words, the one-pedal acceleration instruction value A1(Xa) for the one-pedal mode that is calculated based on the characteristic indicated by the broken line in FIG. 29 is output with respect to the accelerator pedal operation amount Xa from the one-pedal instruction switching portion 35B to the braking/driving distribution portion 35C as the one-pedal acceleration instruction value A(Xa).

If the one-pedal acceleration instruction value A(Xa) has a positive value in this case, the braking/driving distribution portion 35C outputs this one-pedal acceleration instruction value A(Xa) having the positive value to the driving force control portion 36 as the driving acceleration instruction value Aa(Xa). The driving force control portion 36 outputs the driving instruction for outputting the driving force according to the driving acceleration instruction value Aa(Xa) to the driving motor 23 (the inverter thereof) serving as the driving apparatus.

On the other hand, if the one-pedal acceleration instruction value A(Xa) has a negative value, the braking/driving distribution portion 35O outputs this one-pedal acceleration instruction value A(Xa) having the negative value to the one-pedal instruction addition portion 37C of the braking instruction calculation portion 37 as the braking one-pedal acceleration instruction value Ab(Xb). Now, for example, if the brake pedal 6 is not operated, i.e., the brake pedal operation amount Xb is zero, the braking one-pedal acceleration instruction value Ab(Xa) is output from the one-pedal instruction addition portion 37C to the braking force control portion 38 as the braking acceleration instruction value Bb(Xa, Xb). As a result, the braking force can be provided to the vehicle according to the operation on the accelerator pedal 21, which is the one of pedals. In other words, the braking force can be automatically provided even when the brake pedal 6, which is the other of pedals, is not operated.

On the other hand, if the brake pedal 6, which is the other of pedals, is operated, the non-one-pedal acceleration instruction value B(Xb) according to the brake pedal operation amount Xb thereof and the braking one-pedal acceleration instruction value Ab(Xb) are added by the one-pedal instruction addition portion 37C. Then, the result of this addition, (the sum) is output to the braking force control portion 33 as the braking acceleration instruction value Bb(Xa, Xb).

At this time, the switching switch 37B1 of the non-one-pedal instruction switching portion 37B of the braking instruction calculation portion 37 selects the acceleration instruction value B1(Xb) at the time of the one-pedal mode. In other words, the non-one-pedal acceleration instruction value B1(Xb) for the one-pedal mode that is calculated based on the characteristic indicated by the broken line in FIG. 30 is output with respect to the brake pedal operation amount Xb from the non-one-pedal instruction switching portion 37B to the one-pedal instruction addition portion 37C as the non-one-pedal acceleration instruction value B(Xb).

Further, in the case where the mode is switched from the normal mode to the one-pedal mode while the brake pedal 6 is being operated, the non-one-pedal acceleration instruction value characteristic difference ΔB(Xb) when the mode is switched is output from the acceleration instruction value difference calculation portion 35B3 for the measure against the change in the deceleration as the acceleration instruction value difference ΔB' for the measure against the change in the deceleration. This acceleration instruction value difference ΔB' for the measure against the change in the deceleration is added to the one-pedal acceleration instruction value A1(Xa) at the time of the one-pedal mode by the addition portion 35B2. Then, the one-pedal acceleration instruction value A1'(Xa) after the application of the measure against the change in the deceleration, which is the result of this addition (the sum), is output from the one-pedal instruction switching portion 35B as the one-pedal acceleration instruction value A(Xa).

Now, the acceleration instruction value difference ΔB' fox the measure against the change in the deceleration corresponds to the difference between the non-one-pedal acceleration instruction value Bn(Xb) for the normal mode and the non-one-pedal acceleration instruction value B1(Xb) for the one-pedal mode that is generated along with the mode switching by the non-one-pedal instruction switching portion 37B. Therefore, even when the non-one-pedal acceleration instruction value B(Xb) is switched from the non-one-pedal acceleration instruction value Bn(Xb) for the normal mode to the non-one-pedal acceleration instruction value B1(Xb) for the one-pedal mode by the non-one-pedal instruction switching portion 37B along with the mode switching, the result (the sum) of adding the one-pedal acceleration instruction value A(Xa) and the non-one-pedal acceleration instruction value B(Xb) can be kept constant between before and after the mode is switched. As a result, the change (the sudden change) in the deceleration can be prevented or reduced.

In this manner, according to the embodiment, the acceleration/deceleration control apparatus 31 switches the instruction value characteristic so as to prevent the deceleration from suddenly changing or reducing independently of the pedal operation in the case where the mode is switched from the normal mode to the one-pedal mode while the brake pedal 6 is being operated. More specifically, the acceleration/deceleration control apparatus 31 outputs the one-pedal acceleration instruction value A(Xa) in such a manner that the result of adding the non-one-pedal acceleration instruction value B1(Xb) for the one-pedal mode and the one-pedal acceleration instruction value A1(Xa) for the one-pedal mode after the mode is switched matches the non-one-pedal acceleration instruction value Bn(Xb) for the normal mode before the mode is switched. At this time, the one-pedal acceleration instruction value A1(Xa) for the one-pedal mode is corrected into A1'(Xa). Therefore, the acceleration/deceleration control apparatus 31 can keep the result of the addition constant between before and after the mode is switched from the normal mode to the one-pedal mode, thereby maintaining the acceleration or the deceleration before the mode is switched. As a result, the acceleration/deceleration control apparatus 31 can prevent or out down the sudden change or reduction in the deceleration, thereby succeeding in eliminating or reducing the possibility of causing the driver to feel uncomfortable.

Next, FIGS. 8 to 13 illustrate the second embodiment. The second embodiment is characterized in that the acceleration/deceleration control apparatus 31 is configured to output such a non-one-pedal acceleration instruction value or non-one-pedal deceleration instruction value that a result of adding the non-one-pedal acceleration instruction value or the non-one-pedal deceleration instruction value for the one-pedal mode and the one-pedal acceleration/deceleration instruction value for the one-pedal mode after the mode is switched matches the non-one-pedal acceleration instruction value or deceleration instruction value for the normal mode before the mode is switched. The second embodiment will be described, indicating similar components to the first embodiment by the same reference numerals and omitting descriptions thereof.

Figure 9:
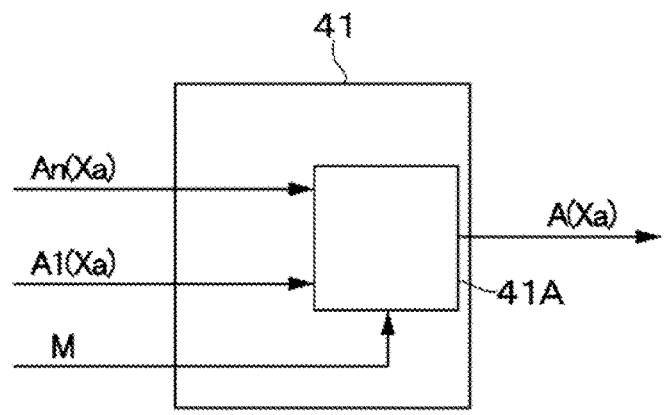
FIG. 9 is a block diagram illustrating a one-pedal instruction switching portion illustrated in FIG. 8.

As illustrated in FIG. 8, the acceleration instruction values An(Xa) and A1(Xa) calculated by the one-pedal acceleration instruction value calculation portion 35A and the mode switching signal M from the mode switching portion 34 are input to a one-pedal, instruction switching portion 41 according to the second embodiment. More specifically, as illustrated in FIG. 9, the one-pedal instruction switching portion 41 includes a switching switch 41A. The acceleration instruction values An(Xa) and A1(Xa) and the mode switching signal M are input to the switching switch 41A.

The switching switch 41A outputs the one-pedal acceleration instruction value An(Xa) at the time of the normal mode to the braking/driving distribution portion 35C as the one-pedal acceleration instruction value A(Xa), if the mode switching signal M indicates the normal mode M. On the other hand, the switching switch 41A outputs the one-pedal acceleration instruction value A1(Xa) at the time of the one-pedal mode to the braking/driving distribution portion 35C as the one-pedal acceleration instruction value A(Xa), if the mode switching signal M indicates the one-pedal mode M1.

On the other hand, as illustrated in FIG. 8, the brake pedal operation amount Xb detected by the brake pedal operation amount detection portion 33, the acceleration instruction values Bn(Xb) and B1(Xb) calculated by the non-one-pedal acceleration instruction value calculation portion 37A, the mode switching signal M switched by the mode switching portion 34, and the braking one-pedal acceleration instruction value Ab(Xa) distributed by the braking/driving distribution portion 35C are input to a non-one-pedal instruction switching portion 42 according to the second embodiment.

Figure 10:
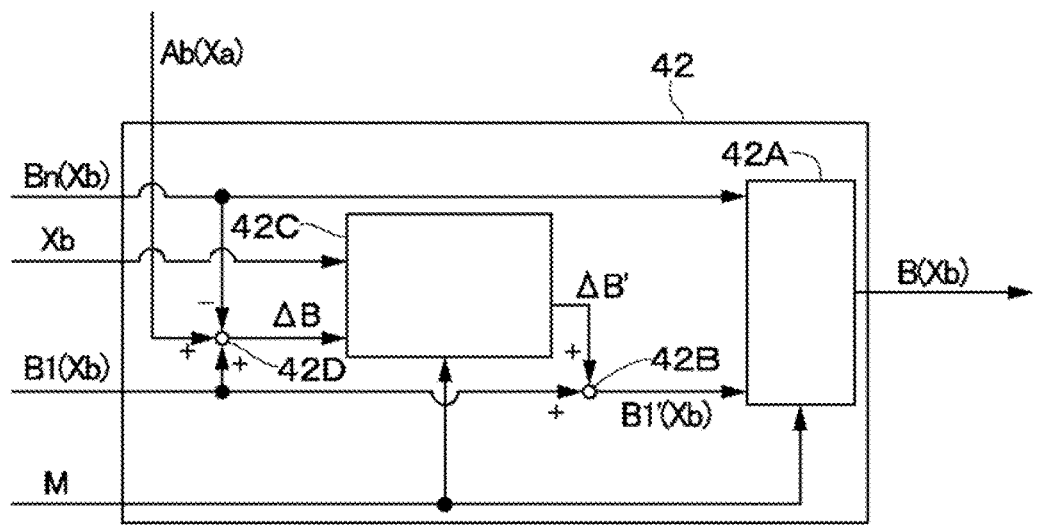
FIG. 10 is a block diagram illustrating a non-one-pedal instruction switching portion illustrated in FIG. 8.

More specifically, as illustrated in FIG. 10, the non-one-pedal instruction switching portion 42 includes a switching switch 42A. The switching switch 42A selects the non-one-pedal acceleration instruction value Bn(Xb) for the normal mode if the mode switching signal M indicates the normal mode Mn. On the other hand, the switching switch 42A selects a non-one-pedal acceleration instruction value B1'(Xb) after the application of the measure against the change in the deceleration for the one-pedal mode if the mode switching signal M indicates the one-pedal mode M1. The switching switch 42A outputs this selected value (a selected instruction value) to the one-pedal instruction addition portion 37C as the non-one-pedal acceleration instruction value B(Xb).

Now, the non-one-pedal acceleration instruction value B1'(Xb) after the application of the measure against the change in the deceleration for the one-pedal mode is a result (a sum) of adding the non-one-pedal acceleration instruction value B1(Xb) for the one-pedal mode and the acceleration instruction value difference ΔB' for the measure against the change in the deceleration. The acceleration instruction value difference ΔB' for the measure against the change in the deceleration is calculated by an acceleration instruction value difference calculation portion 42C for the measure against the change in the deceleration.

For this purpose, the non-one-pedal instruction switching portion 42 includes an addition portion 42B and the acceleration instruction value difference calculation portion 42C for the measure against the change in the deceleration. The addition portion 42B adds the non-one-pedal acceleration instruction value B1(Xb) for the one-pedal mode and the acceleration instruction value difference ΔB' for the measure against the change in the deceleration, and outputs a value acquired from this addition (a sum) to the switching switch 42A as the non-one-pedal acceleration instruction value B1'(Xb) after the application of the measure against the change in the deceleration for the one-pedal mode.

The mode switching signal M, the non-one-pedal acceleration instruction value difference ΔB, and the brake pedal operation amount Xb are input to the acceleration instruction value difference calculation portion 42C for the measure against the change in the deceleration. The acceleration instruction value difference calculation portion 42C calculates the acceleration instruction value difference ΔB' for the measure against the change in the deceleration based on the mode switching signal M, the non-one-pedal acceleration instruction value difference ΔB, and the brake pedal operation amount Xb.

Now, the non-one-pedal acceleration instruction value difference ΔB is a value calculated by the following equation, an equation 2 from the non-one-pedal acceleration instruction value Bn(Xb) at the time of the normal mode, the non-one-pedal acceleration instruction value B1(Xb) at the time of the one-pedal mode, and the braking one-pedal acceleration instruction value Ab(Xa) calculated by the braking/driving distribution portion 35C. The non-one-pedal acceleration instruction value difference ΔB is calculated by a non-one-pedal acceleration instruction value difference calculation portion 42D.

$$\Delta B = B1(Xb) + Ab(Xa) - Bn(Xb) \quad \text{[Equation 2]}$$

The acceleration instruction value difference calculation portion 42C for the measure against the change in the deceleration holds the non-one-pedal acceleration instruction value difference ΔB(Xb) at the moment that the mode switching signal M is switched from the normal mode Mn to the one-pedal mode M1, and sets it as the acceleration instruction value difference ΔB' for the measure against the change in the deceleration. This acceleration instruction value difference ΔB' corresponds to discontinuity of the braking one-pedal acceleration instruction value Ab(Xa) at the braking/driving distribution portion 35C that is generated due to the difference between the one-pedal acceleration instruction value An(Xa) for the normal mode and the one-pedal acceleration instruction value A1(Xa) for the one-pedal mode that is generated along with the mode switching by the one-pedal instruction switching portion 41.

Then, the addition portion 42B adds this difference ΔB' to the non-one-pedal acceleration instruction value B1(Xb) for the one-pedal mode, Therefore, the non-one-pedal acceleration instruction value B1'(Xb) after the application of the measure against the change in the deceleration is input to the switching switch 42A. The non-one-pedal acceleration instruction value B1'(Xb) after the application of the measure against the change in the deceleration is the non-one-pedal acceleration instruction value B1(Xb) for the one-pedal mode that is increased by an amount corresponding to the discontinuity of the braking one-pedal acceleration instruction value Ab(Xa) at the braking/driving distribution portion 35C that is generated due to the difference between the one-pedal acceleration instruction value An(Xa) for the normal mode and the one-pedal acceleration instruction value A1(Xa) for the one-pedal mode that is generated along with the mode switching by the one-pedal instruction switching portion 41.

Then, this non-one-pedal acceleration instruction value B1'(Xb) after the application of the measure against the change in the deceleration is set as the non-one-pedal acceleration instruction value B(Xb), and a value acquired by adding this non-one-pedal acceleration instruction value B(Xb) and the braking one-pedal acceleration instruction value Ab(Xa) is set as the acceleration instruction value as the entire vehicle immediately after the mode is switched, i.e., the vehicle acceleration instruction value serving as the target acceleration/deceleration instruction value of the vehicle. This allows the acceleration/deceleration control apparatus 31 to maintain the acceleration or the deceleration before the mode is switched without causing the discontinuity in the acceleration instruction value, thereby succeeding in preventing or reducing the change in the deceleration when the mode is switched.

However, the non-one-pedal acceleration instruction value B1'(Xb) after the application of the measure against the change in the deceleration ends up having a difference in the characteristic thereof by the amount corresponding to ΔB' from the non-one-pedal acceleration instruction value characteristic B1(Xb) for the one-pedal mode for performing the deceleration control according to the brake pedal operation amount Xb in the one-pedal mode. To resolve this difference, for example, as illustrated in FIG. 11, the acceleration instruction value difference calculation portion 42C for the measure against the change in the deceleration is assumed to be reducing the value of ΔB' (reducing the acceleration) so that the non-one-pedal acceleration instruction value B1'(Xb) after the application of the measure against the change in the deceleration approaches the original B1(Xb) characteristic according to the increase/reduction in the brake pedal operation amount Xb.

Figure 11:
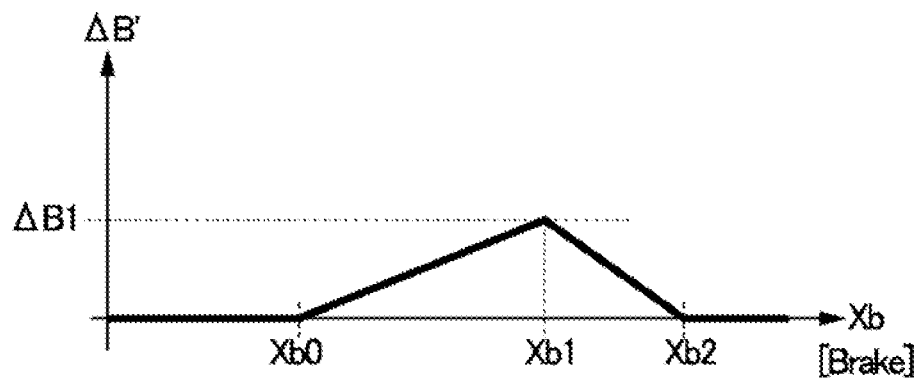
FIG. 11 illustrates a characteristic line indicating one example of the acceleration instruction value difference characteristic for the measure against the change in the deceleration.

FIG. 11 illustrates an example of the characteristic in which the acceleration instruction value difference ΔB' for the measure against the change in the deceleration reduces according to the operation on the brake pedal operation amount Xb, and reaches zero at arbitrary brake pedal operation amounts Xb0 and Xb2, in the case where the mode is switched to the one-pedal mode and the non-one-pedal acceleration instruction value difference at this time is ΔB1 at the brake pedal operation amount Xb1.

The relationship (the characteristic) between the brake pedal operation amount Xb1 and the acceleration instruction value difference ΔB' for the measure against the change in the deceleration is not limited to the characteristic illustrated in FIG. 11. For example, ΔB' may reduce according to an elapse of time since the mode is switched. Further, this characteristic neither has to reduce linearly, and may reduce according to any characteristic.

Figure 12:
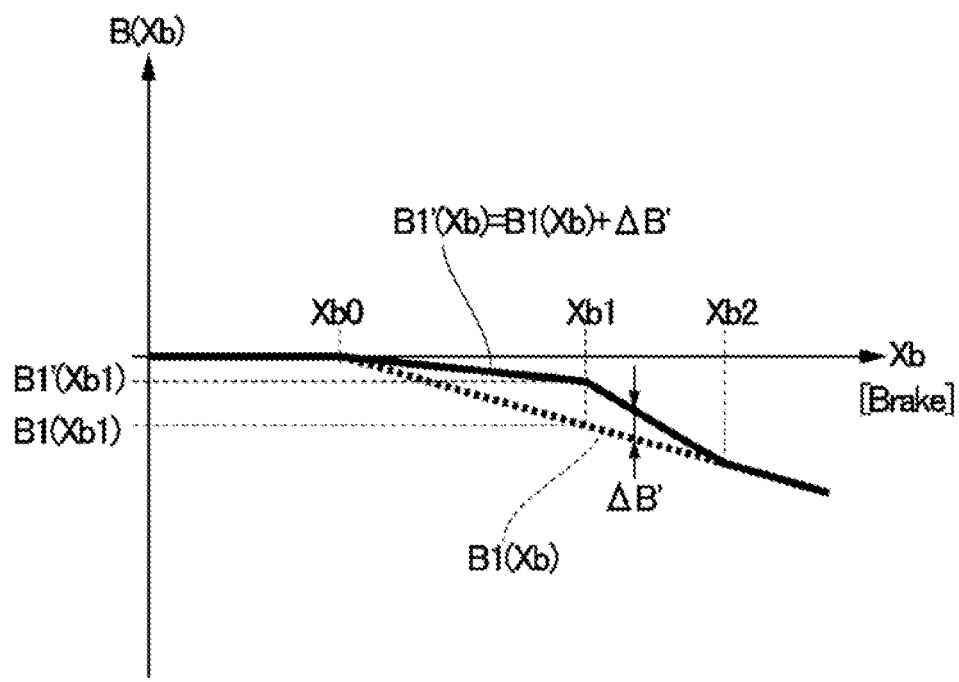
FIG. 12 illustrates a characteristic line indicating one example of a non-one-pedal acceleration instruction value characteristic after the application of the measure against the change in the deceleration with respect to a brake pedal operation amount.

FIG. 12 illustrates a characteristic line indicating what kind of characteristic the non-one-pedal acceleration instruction value characteristic B(Xb) has due to the change in the brake pedal operation amount Xb when the acceleration instruction value difference ΔB' for the measure against the change in the deceleration illustrated in FIG. 11 is employed. As illustrated in FIG. 12, this employment resolves Δ' as the brake pedal operation amount Xb increases/reduces, allowing the non-one-pedal acceleration instruction value characteristic B1(Xb) to realize the same characteristic as the originally set non-one-pedal acceleration instruction value characteristic B1(Xb) for the one-pedal mode at an operation amount equal to or smaller than the brake pedal operation amount Xb0 or equal to or larger than the brake pedal operation amount Xb2.

Figure 13:
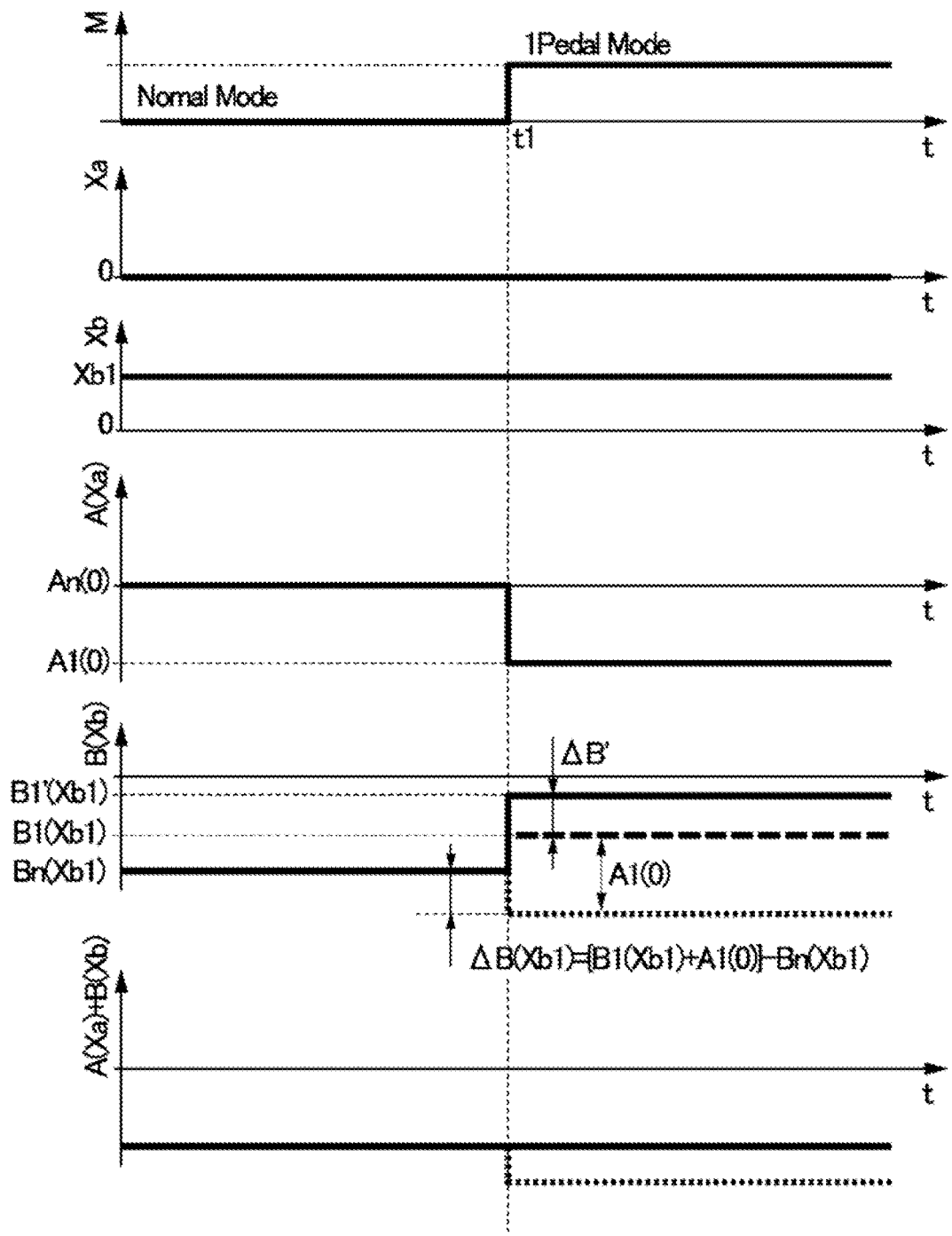
FIG. 13 illustrates characteristic lines indicating one example of the changes in each of the operation amounts and each of the instruction values over time when the mode is switched from the normal mode to the one-pedal mode.

FIG. 13 illustrates characteristic lines (timing charts) indicating changes in each of the operation amounts and each of the instruction values over time when the mode is switched from the normal mode to the one-pedal mode according to the second embodiment.

FIG. 13 illustrates the changes in the case where the mode is switched from the normal mode to the one-pedal mode by the mode switching portion 34 at time t1 while the brake pedal is being operated by the operation amount Xb1 without the accelerator pedal operated (Xa=0) in the normal mode. In this case, according to the mode switching, the one-pedal acceleration instruction value characteristic is switched from the solid line to the broken line illustrated in FIG. 29, and the non-one-pedal acceleration instruction value characteristic is switched from the solid line to the broken line illustrated in FIG. 30.

When the mode is switched from the normal mode to the one-pedal mode as time t1, the non-one-pedal acceleration instruction value characteristic difference ΔB(Xb1) when the mode is switched is expressed by the following equation, an equation 3.

$$\Delta B(Xb1) = \{B1(Xb1) + A1(O)\} - Bn(Xb1) \qquad \text{[Equation 3]}$$

Then, a difference corresponding to this ΔB(Xb1) is set as ΔB' and B1' (XL1) acquired by adding this ΔB' to the non-one-pedal acceleration instruction value B1(Xb1) for the one-pedal mode is calculated as the non-one-pedal acceleration instruction value B1(Xb1). As a result, even when the non-one-pedal acceleration instruction value B(Xb1) is switched from Bn(Xb1) to B1(Xb1) along with the mode switching, the result of adding the non-one-pedal acceleration instruction value B(Xb1) and Ab(0) distributed as the instruction value for the braking is realized as the deceleration of the vehicle. Now, Ab(0) is A1(0) and B(Xb1) is corrected into B1'(Xb1), and the result of adding them matches the result of the addition before the mode is switched, i.e., the result of adding Bn(Xb1) and An(0). Therefore, the acceleration/deceleration control apparatus 31 can prevent or reduce the occurrence of the discontinuity of the deceleration (the vehicle acceleration instruction value) between before and after the mode is switched to thus maintain the acceleration or the deceleration before the mode is switched, thereby succeeding in preventing or cutting down the reduction in the deceleration despite the unchanged brake pedal operation amount.

The second embodiment is configured to correct the non-one-pedal acceleration instruction value B1(Xb) as described above when the mode is switched, and a basic operation thereof is not especially different from the operation performed by the above-described first embodiment.

To sum it up, according to the second embodiment, the acceleration/deceleration control apparatus 31 is configured to output such a non-one-pedal deceleration instruction value that the result of adding the non-one-pedal deceleration instruction value for the one-pedal mode and the one-pedal acceleration/deceleration instruct on value for the one-pedal mode after the mode is switched matches the non-one-pedal deceleration instruction value for the normal mode before the mode is switched, so as to prevent the deceleration from suddenly changing or reducing, in the case where the mode is switched from the normal mode to the one-pedal mode with use of the mode switching portion 34 while the brake pedal 6 is being operated. To achieve that, the non-one-pedal instruction switching portion 42 outputs the non-one-pedal acceleration instruction value B(Xb) (corrects the non-one-pedal acceleration instruction value B1(Xb) info B1'(Xb)) in such a manner that the result of adding the non-one-pedal acceleration instruction value B1(Xb) for the one-pedal mode and the one-pedal acceleration instruction value A1(Xa) for the one-pedal mode after the mode is switched matches the non-one-pedal acceleration instruction value Bn(Xb) for the normal mode before the mode is switched. Therefore, the acceleration/deccceleration control apparatus 31 can keep the result of the addition constant between before and after the mode is switched from the normal mode to the one-pedal mode, thereby maintaining the acceleration or the deceleration before the mode is switched. As a result, the acceleration/deceleration control apparatus 31 can prevent or cut down the sudden change or reduction in the deceleration, thereby succeeding in eliminating or reducing the possibility of causing the driver to feel unconformable.

Next, FIGS. 14 to 18 illustrate the third embodiment. The third embodiment is characterized in that the acceleration/deceleration control apparatus 31 is configured to continue the control based on the non-one-pedal acceleration instruction value or the non-one-pedal deceleration instruction value for the normal mode before the mode is switched until the result of adding the non-one-pedal acceleration instruction value or the non-one-pedal deceleration instruction value for the one-pedal mode and the one-pedal acceleration/deceleration instrument in value for the one-pedal mode after the mode is switched matches the non-one-pedal acceleration instruction value or the non-one-pedal deceleration instruction value for the normal mode before the mode is switched. The third embodiment will be described, indicating similar components to the first and the second embodiments by the same reference numerals and omitting descriptions thereof.

Figure 15:
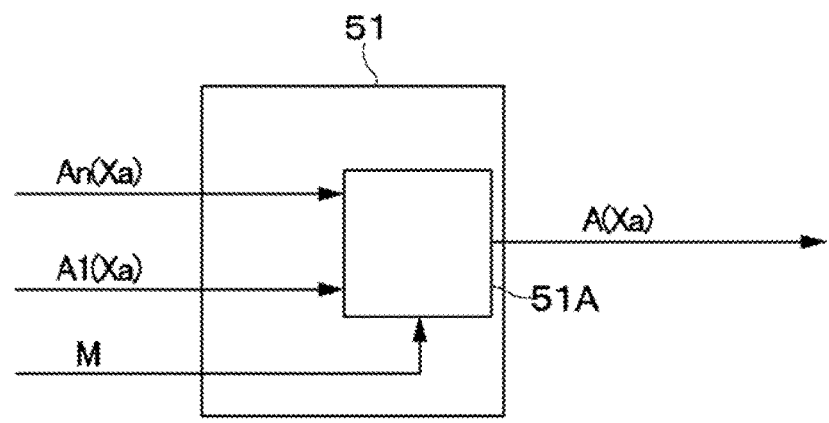
FIG. 15 is a block diagram illustrating a one-pedal instruction switching portion illustrated in FIG. 14.

As illustrated in FIG. 14, the acceleration instruction values An(Xa) and A1(Xa) calculated by the one-pedal acceleration instruction value calculation portion 35A and the mode switching signal M front the mode switching portion 34 are input to a one-pedal instruction switching portion 51 according to the third embodiment. More specifically, as illustrated in FIG. 15, the one-pedal instruction switching portion 51 includes a switching switch/interpolation filter 51A. The acceleration instruction values An(Xa) and A1(Xa) and the mode switching signal M are input to the switching switch/interpolation filter 51A.

The switching switch/interpolation filter 51A basically outputs the one-pedal acceleration instruction value An(Xa) at the time of the normal mode to the braking/driving distribution portion 35C as the one-pedal acceleration instruction value A(Xa), if the mode switching signal M indicates the normal mode M. On the other hand, the switching switch 41 selects the one-pedal acceleration instruction value A1(Xa) at the time of the one-pedal mode and outputs it as the one-pedal acceleration instruction value A(Xa), if the mode switching signal M indicates the one-pedal mode M1. Further, when a difference is generated between the acceleration instruction values An(Xa) and A1(Xa) when the mode is switched, the switching switch/interpolation filter 51A outputs the one-pedal acceleration instruction value A(Xa) so as to smoothly interpolate this difference. The configuration for this interpolation may be any configuration, and, for example, can be a configuration that interpolates the difference due to an elapse of time as discussed in PTL 1.

Figure 16:
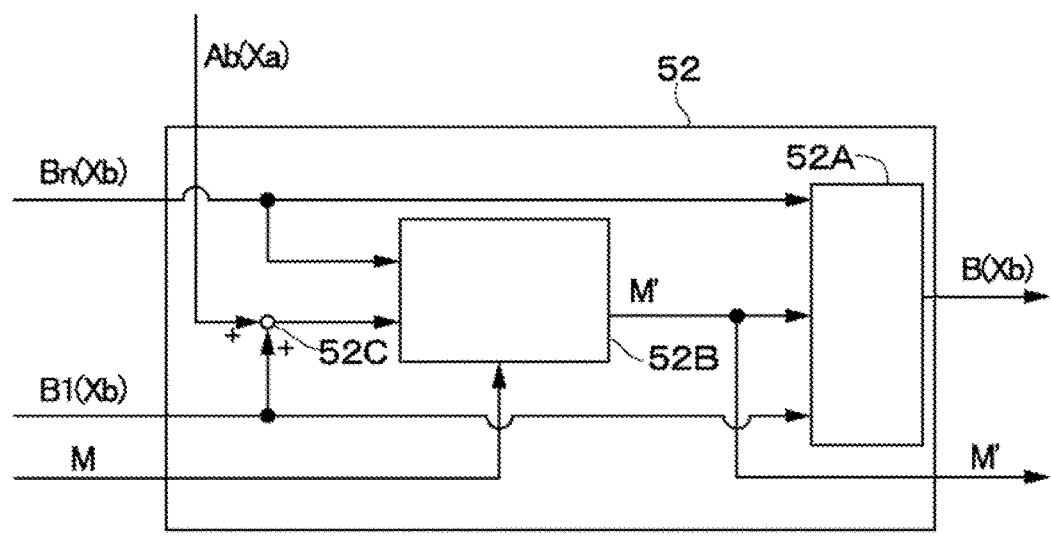
FIG. 16 is a block diagram illustrating a non-one-pedal instruction switching portion illustrated in FIG. 14.

On the other hand, as illustrated in FIGS. 16, a non-one-pedal instruction switching portion 52 according to the third embodiment includes a switching switch 52A and a non-one-pedal instruction comparison/switching possibility/impossibility determination portion 52B. How, the non-one-pedal instruction comparison/switching possibility/impossibility determination portion 52B compares the result of adding the non-one-pedal acceleration instruction value B1(Xb) and the braking one-pedal acceleration instruction value Xb(Xa) at the time of the one-pedal mode, and the non-one-pedal acceleration instruction value Bn(Xb) at the time of the normal mode, when the mode switching signal M from the mode switching portion 34 is switched from the normal mode to the one-pedal mode. Then, if there is a difference therebetween, the non-one-pedal instruction comparison/switching possibility/impossibility determination portion 52B determines that the mode cannot be switched, and continues holding a normal mode Mn' as a mode switching signal M' after whether the mode can be switched is determined. After that, when the result of adding B1(Xb) and Ab(Xa) and Bn(Xb) match each other, the non-one-pedal instruction comparison/switching possibility/impossibility determination portion 52B determines that the mode can be switched and switches the mode switching signal M' after whether the mode can be switched is determined to a one-pedal mode M1'. The non-one-pedal acceleration instruction value B1(Xb) and the braking one-pedal acceleration instruction value Ab(Xa) at the time of the one-pedal mode are added to each other by the addition portion 52C.

The switching switch 52A selects the non-one-pedal acceleration instruction value Bn(Xb) at the time of the normal mode, if the mode switching signal M' after whether the mode can be switched is determined is the normal mode Mn'. On the other hand, the switching switch 52A selects the non-one-pedal acceleration instruction value B1(Xb) at the time of the one-pedal mode, if the mode switching signal M' after whether the mode can be switched is determined is the one-pedal mode M1'. The switching switch 52A outputs this selected value (a selected instruction value) to a one-pedal instruction addition portion 53 as the non-one-pedal acceleration instruction value B(Xb).

As a result, the characteristic is not switched and the acceleration or the deceleration before the mode is switched is maintained until the result of adding the non-one-pedal acceleration instruction value B1(Xb) and the braking one-pedal acceleration instruction value Ab(Xa) at the time of the one-pedal mode matches the non-one-pedal acceleration instruction value Bn(Xb) at the time of the normal mode that has been realized at the time of the normal mode even when the mode switching signal M is switched from the normal mode to the one-pedal mode, and therefore this configuration allows the acceleration/deceleration control apparatus 31 to prevent or reduce the change in the deceleration.

Figure 17:
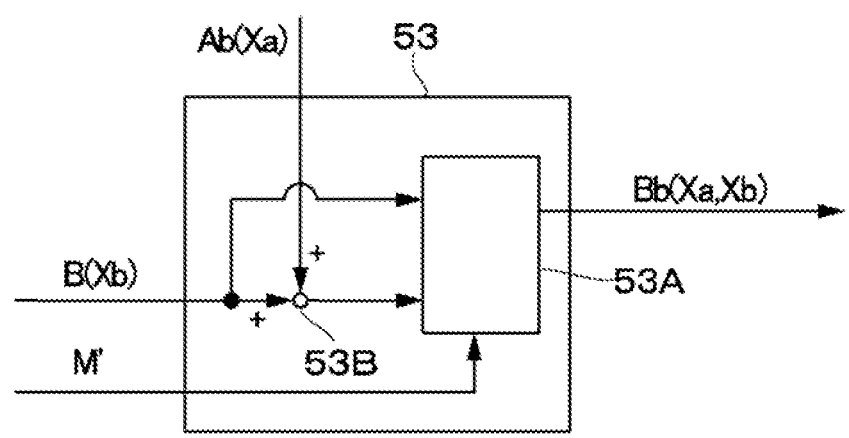
FIG. 17 is a block diagram illustrating a one-pedal instruction addition portion illustrated in FIG. 14.

In the third embodiment configured in this manner, as illustrated in FIGS. 14 and 17, the one-pedal instruction addition portion 53 includes a braking instruction switching switch 53A. The braking instruction switching switch 53A. selects only the non-one-pedal acceleration instruction value B(Xb), if the mode switching signal M' after whether the mode can be switched is determined is the normal mode Mn'. On the other hand, the braking instruction switching switch 53A selects the result of adding the non-one-pedal acceleration instruction value B(Xb) and the braking one-pedal acceleration instruction value Ab(Xa), if the mode switching signal M' after whether the mode can be switched is determined is the one-pedal mode M1'. The braking instruction switching switch 53A outputs this selected value (a selected instruction value) to the braking force control portion 38 as the braking acceleration instruction value Bb(Xa, Xb). The non-one-pedal acceleration instruction value B(Xb) and the braking one-pedal acceleration instruction value Ab(Xa) are added to each other by the addition portion 53B.

Figure 18:
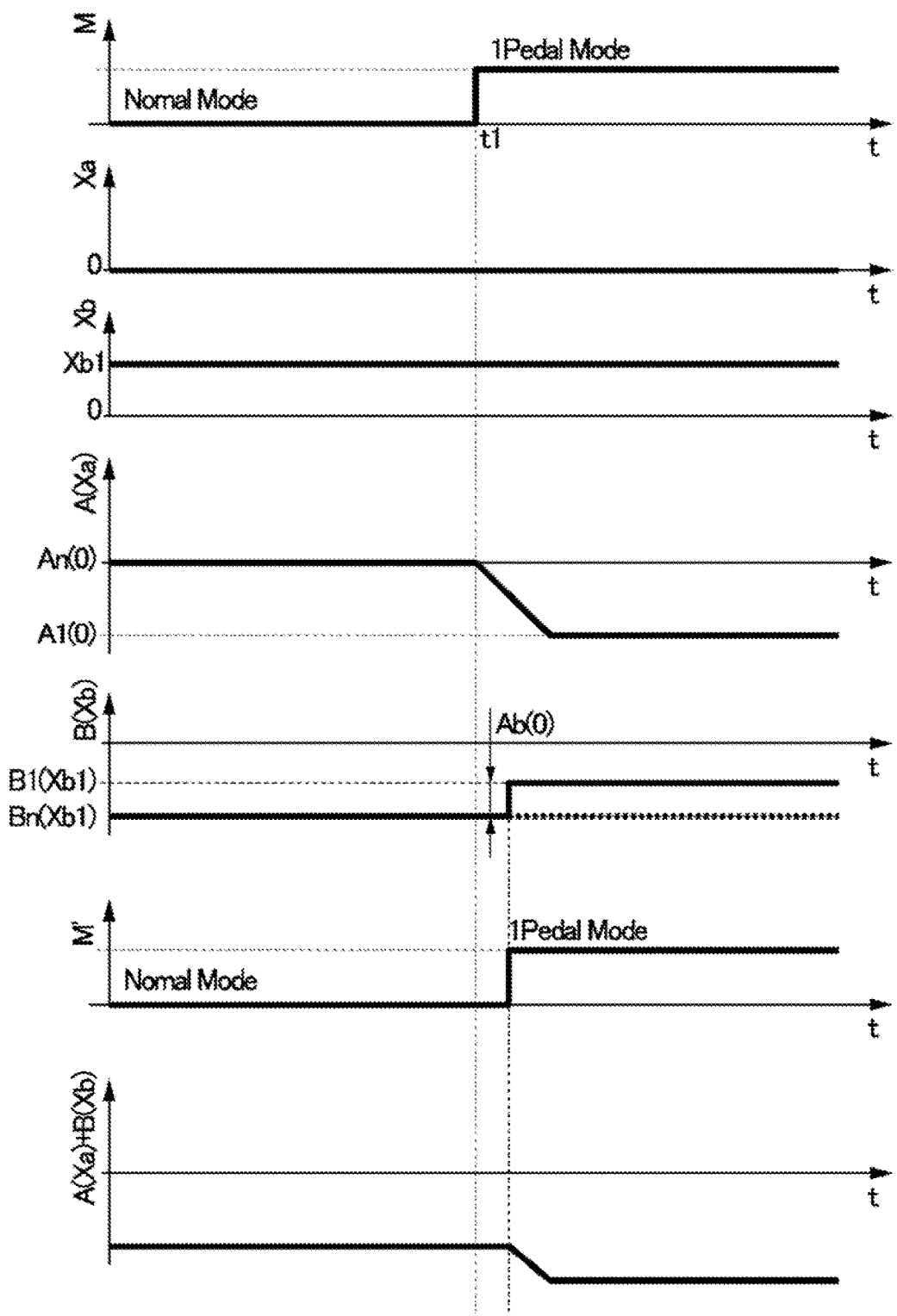
FIG. 18 illustrates characteristic lines indicating one example of the changes in each of the operation amounts and each of the instruction values over time when the mode is switched from the normal mode to the one-pedal mode.

FIG. 18 illustrates characteristic lines (timing charts) indicating changes in each of the operation amounts and each of the instruction values over time when the mode is switched from the normal mode to the one-pedal mode according to the third embodiment.

FIG. 18 illustrates the changes in the case where the mode is switched from the normal mode to the one-pedal mode by the mode switching portion 34 at time t1 while the brake pedal is being operated by the operation amount Xb1 without the accelerator pedal operated (Xa=0) in the normal mode. In this case, according to the mode switching, the one-pedal acceleration instruction value characteristic is switched from the solid line to the broken line illustrated in FIG. 29, and the non-one-pedal acceleration instruction value characteristic is switched from the solid line to the broken line illustrated in FIG. 30.

As illustrated in FIG. 18, when the mode is switched from the normal mode to the one-pedal mode at time t1, the one-pedal acceleration instruction value A(Xa) changes so as to smoothly interpolate the difference between the one-pedal acceleration instruction value An(0) at the time of the normal mode and the one-pedal acceleration instruction value A1(0) at the time of the one-pedal mode by the switching switch/interpolation filter 51A after the mode is switched. After whether the mode can be switched is determined, the mode switching continues the normal mode and is not switched to the one-pedal mode until this smoothly changing result of adding the braking one-pedal acceleration instruction value Ab(0) and the non-one-pedal acceleration instruction value B1(Xb1) at the time of the one-pedal mode matches the value of the non-one-pedal acceleration instruction value Bn(Xb1) at the time of the normal mode. As a result, the acceleration/deceleration control apparatus 31 can prevent or reduce the generation of the discontinuity in the braking acceleration instruction value Bb(0, Xb1) serving as the vehicle acceleration to thus maintain the acceleration or the deceleration before the mode is switched, thereby succeeding in preventing or cutting down the reduction in the deceleration despite the unchanged brake pedal operation amount.

The third embodiment is configured to determine whether the mode switching signal M can be switched and switch the acceleration instruction value at the one-pedal instruction addition portion 53 based on this determination as described above when the mode is switched, and a basic operation thereof is not especially different from the operations performed by the above-described first embodiment and second embodiment.

To sum it up, according to the third embodiment, the acceleration/deceleration control apparatus 31 is configured to continue the control based on the non-one-pedal deceleration instruction value for the normal mode before the mode is switched until the result of adding the non-one-pedal deceleration instruction value for the one-pedal mode and the one-pedal acceleration/deceleration instruction value for the one-pedal mode after the mode is switched matches the non-one-pedal deceleration instruction value for the normal mode before the mode is switched so as to prevent the deceleration from suddenly changing or reducing in the case where the mode is switched from the normal mode to the one-pedal mode with use of the mode switching portion 34 while the brake pedal 6 is being operated, thereby maintaining the acceleration or the deceleration before the mode is switched. To achieve that, the non-one-pedal instruction switching portion 52 and the one-pedal instruction addition portion 53 continue the control based on the non-one-pedal acceleration instruction value Bn(Xb) for the normal mode before the mode is switched until the result of adding the non-one-pedal acceleration instruction value B1(Mb) for the one-pedal mode and the one-pedal acceleration instruction value A1(Xa) for the one-pedal mode after the mode is switched matches the non-one-pedal acceleration instruction value Bn(Xb) for the normal mode before the mode is switched. Therefore, the acceleration/deceleration control apparatus 31 can keep the result of the addition constant between before and after the mode is switched from the normal mode to the one-pedal mode. As a result, the acceleration/deceleration control apparatus 31 can prevent or cut down the sudden change or reduction in the deceleration to thus maintain the acceleration or the deceleration before the mode is switched, thereby succeeding in eliminating or reducing the possibility of causing the driver to feel uncomfortable. In addition, the acceleration/deceleration, control apparatus 31 can also prevent or cut down the reduction in the deceleration while performing the filter processing for resolving the difference in the instruction value between before and after the mode is switched.

Next, FIGS. 19 to 24 illustrate the fourth embodiment. The fourth embodiment is characterized in that the acceleration/deceleration control apparatus 31 is configured to perform control while adding a difference between a result of adding the non-one-pedal acceleration instruction value or deceleration instruction value for the one-pedal mode and the acceleration/deceleration instruction value for the one-pedal mode before the mode is switched, and the non-one-pedal acceleration instruction value or deceleration instruction value for the normal mode after the mode is switched to the non-one-pedal acceleration instruction value or deceleration instruction value for the normal mode after the mode is switched. The fourth embodiment will be described, indicating similar components to the first to third embodiments by the same reference numerals and omitting descriptions thereof.

In FIG. 19, any of the one-pedal instruction switching portion 41 according to the second embodiment and the one-pedal instruction switching portion 51 according to the third embodiment may be used as a one-pedal instruction switching portion 61 according to the fourth embodiment.

Figure 20:
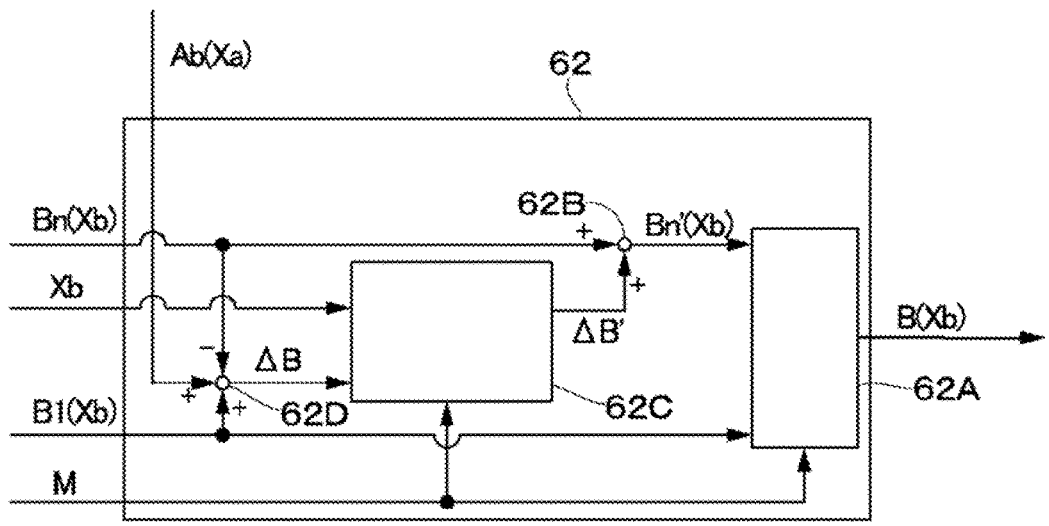
FIG. 20 is a block diagram illustrating a non-one-pedal instruction switching portion illustrated in FIG. 19.
Figure 21:
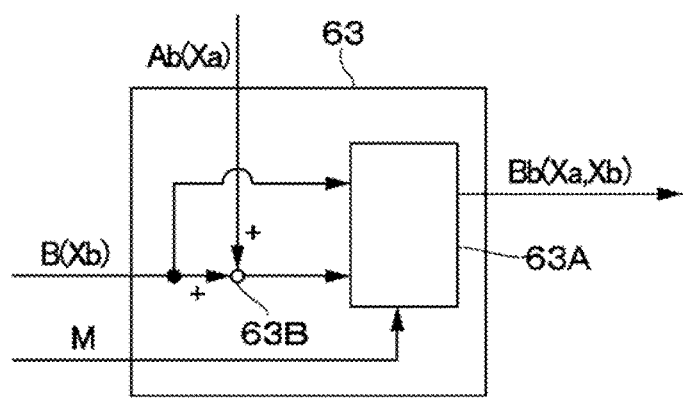
FIG. 21 is a block diagram illustrating a one-pedal instruction addition portion illustrated in FIG. 19.

On the other hand, as illustrated in FIG. 20, a non-one-pedal instruction switching portion 62 according to the fourth embodiment includes a switching switch 62A. The switching switch 62A selects a non-one-pedal acceleration instruction value Bn'(Xb) after application of a measure regarding the deceleration for the normal mode if the mode switching signal M indicates the normal mode Mn. On the other hand, the switching switch 62A selects the non-one-pedal acceleration instruction value B1(Xb) for the one-pedal mode if the mode switching signal M indicates the one-pedal mode M1. The switching switch 62A outputs this selected, value (a selected instruction value) to the one-pedal instruction addition portion 37C as the non-one-pedal acceleration instruction value B (Xb).

Now, the non-one-pedal acceleration instruction value Bn' after the application of the measure against the change in the deceleration for the normal mode is a result (a sum) of adding the non-one-pedal acceleration instruction value Bn(Xb) for the normal mode and the acceleration instruction value difference $\Delta B'$ for the measure against the change in the deceleration. The acceleration instruction value difference $\Delta B'$ for the measure against the change in the deceleration is calculated by an acceleration instruction value difference calculation portion 62C for the measure against the change in the deceleration.

For this purpose, the non-one-pedal instruction switching portion 62 includes an addition portion 62B and the acceleration instruction value difference calculation portion 62C for the measure against the change in the deceleration. The addition portion 62B adds the non-one-pedal acceleration instruction value Bn(Xb) for the normal mode and the acceleration instruction value difference $\Delta B'$ for the measure against the change in the deceleration, and outputs this value acquired from the addition (the sum) to the switching switch 62A as the non-one-pedal acceleration instruction value Bn'(Xb) after the application of the measure against the change in the deceleration for the normal mode.

The mode switching signal M, the non-one-pedal acceleration instruction value difference $\Delta B$, and the brake pedal operation amount Xb are input to the acceleration instruction value difference calculation portion 62C for the measure against the change in the deceleration. The acceleration instruction value difference calculation portion 62C calculates the acceleration instruction value difference $\Delta B'$ for the measure against the change in the deceleration based on the mode switching signal M, the non-one-pedal acceleration instruction value difference $\Delta B$, and the brake pedal operation amount Xb.

Now, the non-one-pedal acceleration instruction value difference $\Delta B$ is a value calculated according to the following equation, an equation 4 from the non-one-pedal acceleration instruction value Bn(Xb) at the time of the normal mode, the non-one-pedal acceleration instruction value B1(Xb) at the time of the one-pedal mode, and the braking one-pedal acceleration instruction value Ab(Xa) calculated by the braking/driving distribution portion 35C. The non-one-pedal acceleration instruction value difference $\Delta B$ is calculated by a non-one-pedal acceleration instruction value difference calculation portion 62D.

$$\Delta B = B1(Xb) + Ab(Xa) - Bn(Xb) \qquad \text{[Equation 4]}$$

The acceleration instruction value difference calculation portion 62C for the measure against the change in the deceleration holds the non-one-pedal acceleration instruction value difference $\Delta B(Xb)$ at the moment that the mode switching signal M is switched from the one-pedal mode M1 to the normal mode Mn, and sets it as the acceleration instruction value difference ΔB' for the measure against the change in the deceleration.

On the other hand, as illustrated in FIGS. 19 and 20, the one-pedal instruction addition portion 63 includes a braking instruction switching switch 63A. The braking instruction switching switch 63A selects only the non-one-pedal acceleration instruction value B(Xb) if the mode switching signal M is the normal mode Mn. On the other hand, the braking instruction switching switch 63A selects the result of adding the non-one-pedal acceleration instruction value B(Xb) and the braking one-pedal, acceleration instruction value Ab(Xa) if the mode switching signal M is the one-pedal mode M1. The braking instruction switching switch 63A outputs this selected value (a selected instruction value) to the braking force control portion 38 as the braking acceleration instruction value Bb(Xa, Xb). The non-one-pedal acceleration instruction value B(Xb) and the braking one-pedal acceleration instruction value Ab(Xa) are added to each other by the addition portion 63B.

As a result, when the mode switching signal M is switched from the one-pedal mode to the normal mode, the result of adding the non-one-pedal acceleration instruction value B1(Xb) at the time of the one-pedal mode that has been realized until immediately before the mode is switched and the braking one-pedal acceleration instruction value Ab(Xa), and the result of adding the acceleration instruction value difference ΔB' for the measure against the change in the deceleration and the non-one-pedal acceleration instruction value Bn(Xb) at the time of the normal mode match each other. As a result, the acceleration or the deceleration before the mode is switched is maintained, and therefore the acceleration/deceleration control apparatus 31 can prevent or reduce the change in the deceleration.

However, the non-one-pedal acceleration instruction value Bn'(Xb) after the application, of the measure against the change in the deceleration ends up having a difference in the characteristic thereof by the amount corresponding to ΔB' from the non-one-pedal acceleration instruction value characteristic Bn'(Xb) for the normal mode for performing the deceleration control according to the brake pedal operation amount Xb in the normal mode. To resolve this difference, for example, the acceleration instruction value difference calculation portion 62C for the measure against the change in the deceleration is assumed to be reducing the value of ΔB' (reducing the deceleration) according to the reduction in the brake pedal operation amount Xb so that the non-one-pedal acceleration instruction value Bn'(Xb) after the application of the measure against the change in the deceleration approaches the original Bn(Xb) characteristic, as illustrated in FIG. 22.

Figure 22:
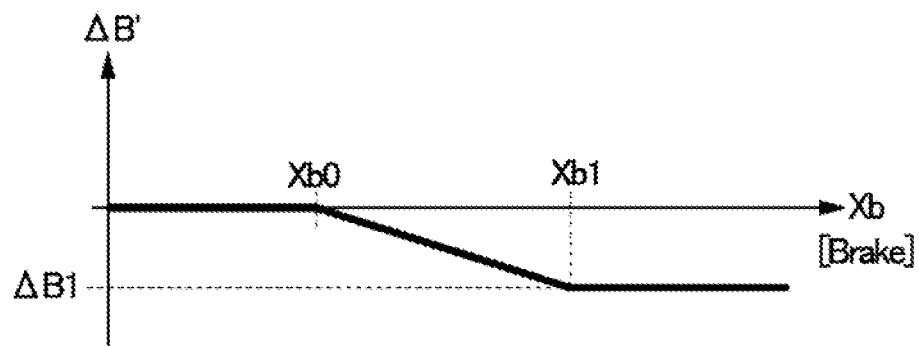
FIG. 22 illustrates a characteristic line indicating one example of the acceleration instruction value difference characteristic for the measure against the change in the deceleration.

FIG. 22 illustrates an example of the characteristic in which the acceleration instruction value difference ΔB' for the measure against the change in the deceleration increases (the deceleration reduces) according to the operation of (the reduction in) the brake pedal operation amount Xb, and reaches zero at the arbitrary brake pedal operation amount Xb0, in a case where the mode is switched to the normal mode at the brake pedal operation amount Xb1 and the non-one-pedal acceleration instruction value difference at this time is ΔB1. In the fourth embodiment, the characteristic is set in such a manner that ΔB' increases (the deceleration reduces) according to the reduction in the brake pedal operation amount Xb, and reaches zero at the arbitrary brake pedal operation amount Xb0. Further, the characteristic is set in such a manner that the value of ΔB' is maintained when the brake pedal operation amount matches or exceeds Xb1.

The relationship (characteristic) between the brake pedal operation amount Xb and the acceleration instruction value difference ΔB' for the measure against the change in the deceleration is not limited to the characteristic illustrated in FIG. 22. For example, ΔB' may increase according to the increase or reduction in the brake pedal operation amount Xb, starting from the brake pedal operation amount Xb at the moment that the mode is switched to the normal mode. Alternatively, ΔB' may increase according to an elapse of time since the mode is switched. Further, this characteristic neither has to increase linearly, and may increase according to any characteristic. Further, the value of ΔB' that has first increased due to the change in the brake pedal operation amount Xb does not have to reduce (the deceleration does not have to increase) after that. For example, the characteristic may be set in such a manner that the value of ΔB' increases when the brake pedal operation amount reduces, is maintained without reducing when the brake pedal operation amount increases, and increases when the brake pedal operation amount reduces again, in a case where the driver performs such an operation that the operation amount repeatedly increases and reduces between the brake pedal operation amounts Xb1 and Xb0.

Figure 23:
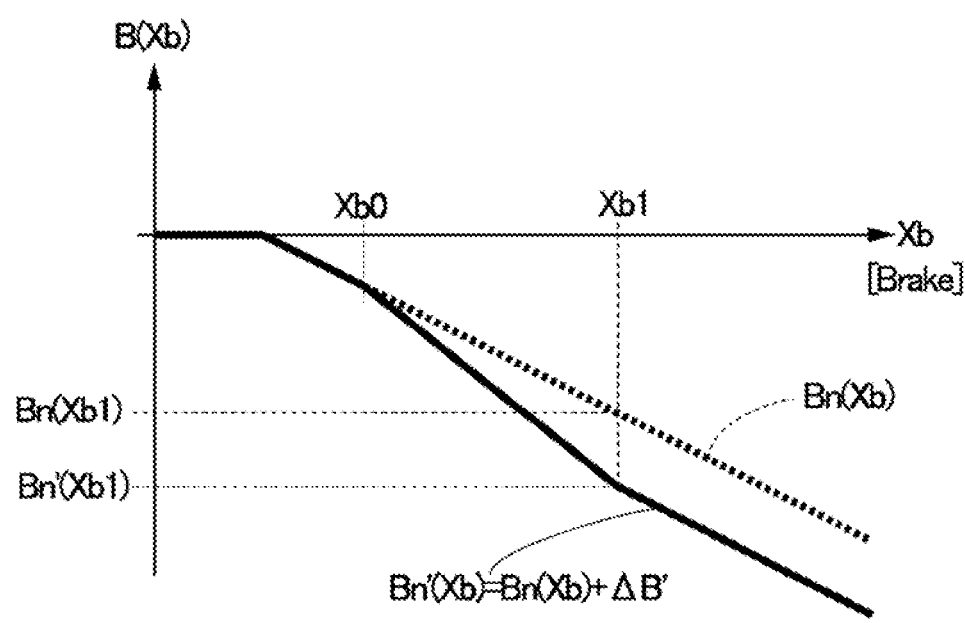
FIG. 23 illustrates a characteristic line indicating one example of the non-one-pedal acceleration instruction value characteristic after the application of the measure against the change in the deceleration with respect to the brake pedal operation amount.

FIG. 23 illustrates a characteristic line indicating what kind of characteristic the non-one-pedal acceleration instruction value characteristic B(Xb) has due to the change in the brake pedal operation amount Xb in the case where the acceleration instruction value difference ΔB' for the measure against the change in the deceleration illustrated in FIG. 22 is employed. As illustrated in FIG. 23, this employment resolves ΔB' as the brake pedal operation amount Xb reduces, allowing the non-one-pedal acceleration instruction value characteristic B(Xb) to realize the same characteristic as the originally set non-one-pedal acceleration instruction value characteristic Bn(Xb) for the normal mode at an operation amount equal to or smaller than the brake pedal operation amount Xb0.

Figure 24:
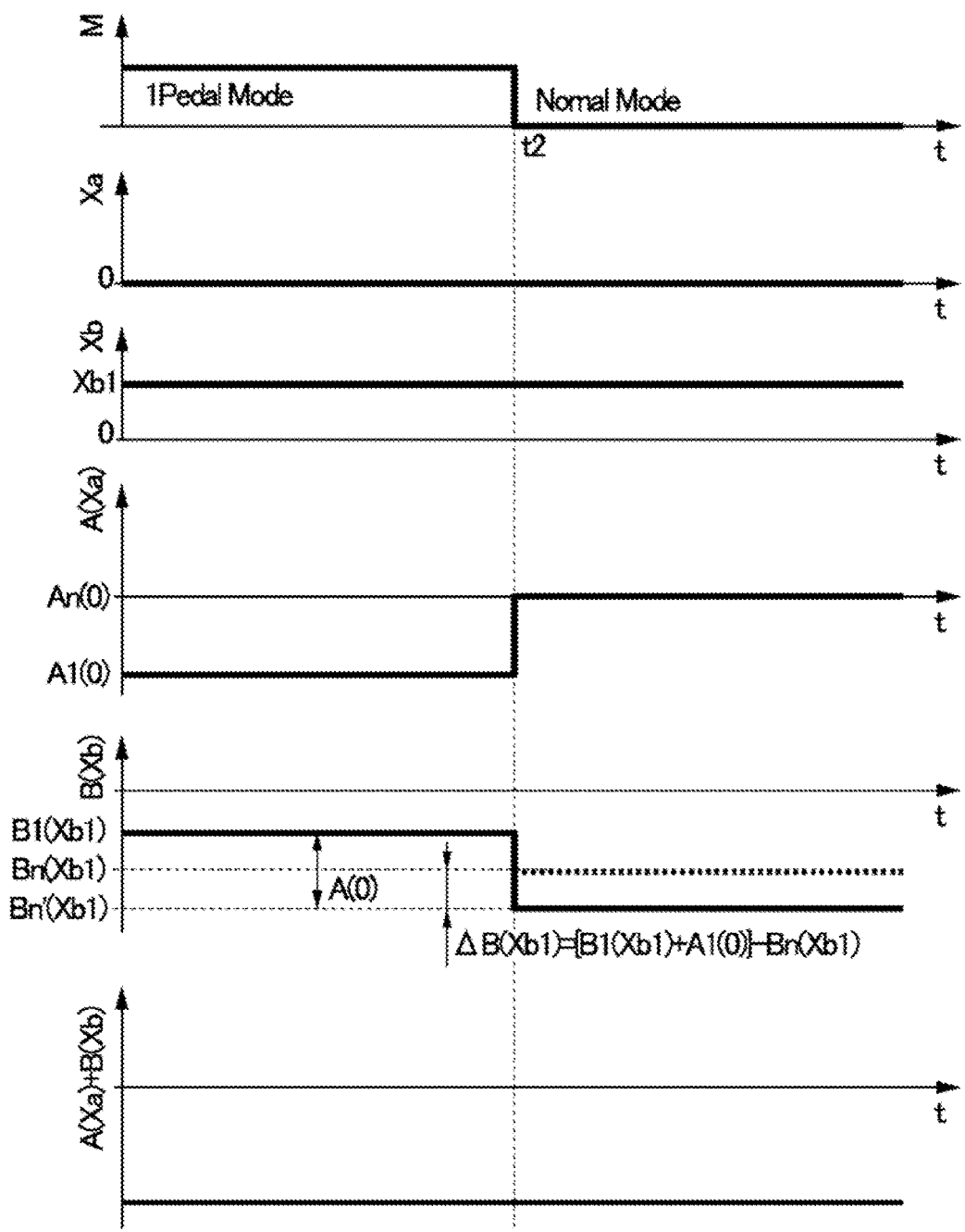
FIG. 24 illustrates characteristic lines indicating one example of the changes in each of the operation amounts and each of the instruction values over time when the mode is switched from the one-pedal mode to the normal mode.

FIG. 24 illustrates characteristic lines (timing charts) indicating changes in each of the operation amounts and each of the instruction values over time when the mode is switched from the one-pedal mode to the normal mode according to the fourth embodiment.

FIG. 24 illustrates the changes in a case where the mode is switched from the one-pedal mode to the normal mode by the mode switching portion 34 at time t2 while the brake pedal is being operated by the operation amount Xb1 without the accelerator pedal operated (Xa=0) in the one-pedal mode. In this case, according to the switching of the mode, the one-pedal pedal acceleration instruction value characteristic is switched from the broken line to the solid line illustrated in FIG. 29, and the non-one-pedal acceleration instruction value characteristic is switched from the broken line to the solid line illustrated in FIG. 30.

When the mode is switched from the one-pedal mode to the normal mode at time t2, a difference corresponding to the non-one-pedal acceleration instruction value characteristic difference ΔB (Xb1) when the mode is switched is set as ΔB', and Bn'(Xb) acquired by adding this ΔB' to the non-one-pedal acceleration instruction value Bn(Xb) for the normal mode is calculated as the non-one-pedal acceleration instruction value B(Xb). As a result, even when the one-pedal acceleration instruction value A(Xa) is switched from A1(Xa) to An(Xa) when the mode is switched), the non-one-pedal acceleration instruction value Bn'(Xb1) is realized, as the deceleration of the vehicle. Therefore, the acceleration/deceleration control apparatus 31 can prevent or reduce the occurrence of the discontinuity in the deceleration to thus maintain the acceleration or the deceleration before the mode is switched, thereby succeeding in preventing or cutting down the reduction in the deceleration despite the unchanged brake pedal operation amount.

The fourth embodiment is configured to correct the non-one-pedal acceleration instruction value Bn(Xb) and switch the acceleration instruction value at the one-pedal instruction addition portion 63 as described above when the mode is switched, and a basic operation thereof is not especially different from the operations performed by the above-described first to third embodiments.

To sum it up, according to the fourth embodiment, the acceleration/deceleration control apparatus 31 is configured to perform control while adding the difference between the result of adding the non-one-pedal deceleration instruction value for the one-pedal mode and the one-pedal acceleration/deceleration instruction value for the one-pedal mode before the mode is switched and the non-one-pedal deceleration instruction value for the normal mode after the mode is switched to the non-one-pedal deceleration instruction value for the normal mode after the mode is switched, so as to prevent the deceleration from suddenly changing or reducing, in the case where the mode is switched from the one-pedal mode to the normal mode with use of the mode switching portion 34 while the brake pedal 6 is being operated. To achieve that, the non-one-pedal instruction switching portion 62 and the one-pedal instruction addition portion 63 perform control while adding the difference ΔB(Xb) between the result of adding the non-one-pedal acceleration instruction value B1(Xb) for the one-pedal mode and the one-pedal acceleration instruction value A1(Xa) for the one-pedal mode before the mode is switched and the non-one-pedal acceleration instruction value Bn(Xb) for the normal mode after the mode is switched to the non-one-pedal acceleration instruction value Bn(Xb) for the normal mode after the mode is switched. Therefore, the acceleration/deceleration control apparatus 31 can keep the result of the addition constant between before and after the mode is switched from the one-pedal mode to the normal mode, thereby maintaining the acceleration or the deceleration before the mode is switched. As a result, the acceleration/deceleration control apparatus 31 can prevent or cut down the sudden change or reduction in the deceleration, thereby eliminating or reducing the possibility of causing the driver to feel unconformable.

In the first embodiment, the one-pedal mode has been described assuming that the accelerator pedal 21 is set as the pedal for use in the acceleration/deceleration control (both the acceleration control and the deceleration control) in the one-pedal mode, and the brake pedal 6 is set as the pedal not used for the acceleration/deceleration control in the one-pedal mode, by way of example. However, the one-pedal mode is not limited thereto, and, for example, the brake pedal may be set as the pedal for use in the acceleration/deceleration control in the one-pedal mode, and the accelerator pedal may be set as the pedal not used for the acceleration/deceleration control in the one-pedal. In this case, a relationship (a characteristic) between the accelerator pedal operation amount and the non-one-pedal acceleration instruction value, and a relationship (a characteristic) between the brake pedal operation amount and the one-pedal acceleration instruction value (the one-pedal acceleration/deceleration instruction value) can be, for example, set to relationships (characteristics) like the examples illustrated in FIGS. 31 and 32, respectively. The same also applies to the second to fourth embodiments.

In the first embodiment, the configurations of the ECUs have been described assuming that the first ECU 14 and the third ECU 24 are configured as control units prepared as separate units, by way of example. However, the configurations of the ECUs are not limited thereto, and, for example, the first ECU and the third ECU (the second ECU as necessary) may be configured as one control unit by being integrated with each other. The same also applies to the second to fourth embodiments.

In the first embodiment, the braking apparatus has been described assuming that the electric booster 10 is used as the braking apparatus that provides the braking force to the vehicle according to the braking acceleration instruction value Bb(Xa, Xb) calculated by the braking instruction calculation portion 37, more specifically, the braking apparatus that provides the braking force (the automatic brake) to the vehicle based on the operation on the accelerator pedal 21 when the one-pedal mode is selected, by way of example. However, the braking apparatus is not limited thereto, and, for example, the provision of the braking force (the automatic brake) when the one-pedal mode is selected may be achieved by the provision of the braking force by the ESC 12, the provision of the regenerative braking force by the driving motor 23, or the provision of the braking force by the electric parking brake if the brake mechanism is equipped with the electric parking brake.

In the first embodiment, the braking apparatus has been described assuming that the braking apparatus is configured to provide the braking force by increasing the hydraulic pressure (the brake hydraulic pressure) in the hydraulic brake mechanism (the wheel cylinders 4L, 4R, 5L, and 5R) with use of the electric booster 10, by way of example. However, the braking apparatus is not limited thereto, and, for example, may employ the electric brake as the brake mechanism and be configured to provide the braking force by the electric brake.

Further, each of the embodiments is only an example, and, needless to say, the configurations indicated in the different embodiments can be partially replaced or combined.

According to the above-described embodiments, the possibility of causing the driver to feel unconformable can be eliminated or reduced.

(1) That is, according to one embodiment, in the case where the mode is switched with use of the mode switching unit while the pedal for not performing the acceleration/deceleration control in the one-pedal mode is being operated, the acceleration/deceleration control apparatus switches the instruction value characteristic, so as to prevent the acceleration from suddenly changing or reducing if the pedal for not performing the acceleration/deceleration control in the one-pedal mode that is being operated is the accelerator pedal and the deceleration from suddenly changing or reducing if the pedal for not performing the acceleration/deceleration control in the one-pedal mode that is being operated is the brake pedal, independently of the pedal operation. Therefore, the acceleration/deceleration control apparatus can prevent or cut down the sudden change and/or redaction in the acceleration or the deceleration when the mode is switched while the pedal for not performing the acceleration/deceleration control in the one-pedal mode is being operated. As a result, the acceleration/deceleration control apparatus can eliminate or reduce the possibility of causing the driver to feel unconformable.

(2) According to one embodiment, in the case where the mode is switched from the normal mode to the one-pedal mode with use of the mode switching unit while the pedal for not performing the acceleration/deceleration control in the one-pedal mode is being operated, the acceleration/deceleration control apparatus outputs such a one-pedal acceleration/deceleration instruction value that the result of adding the non-one-pedal acceleration instruction value or the non-one-pedal deceleration instruction value for the one-pedal mode and the one-pedal acceleration/deceleration instruction value for the one-pedal mode after the mode is switched matches the non-one-pedal acceleration instruction value or deceleration instruction value for the normal mode before the mode is switched, so as to prevent the acceleration from suddenly changing or reducing if the pedal for not performing the acceleration/deceleration control in the one-pedal mode that is being operated is the accelerator pedal and the deceleration from suddenly changing or reducing if the pedal for not performing the acceleration/deceleration control in the one-pedal mode that is being operated is the brake pedal. Therefore, the acceleration/deceleration control apparatus can keep the result of the addition constant between before and after the mode is switched from the normal mode to the one-pedal mode. As a result, the acceleration/deceleration control apparatus can prevent or cut down the sudden change and/or reduction in the acceleration or the deceleration, thereby succeeding in eliminating or reducing the possibility of causing the driver to feel unconformable.

(3) According to one embodiment, in the case where the mode is switched from tee normal mode to the one-pedal mode with use of the mode switching unit while the pedal for not performing the acceleration/deceleration control in the one-pedal mode is being operated, the acceleration/deceleration control apparatus outputs such a non-one-pedal acceleration instruction value or non-one-pedal deceleration instruction value that the result of adding the non-one-pedal acceleration instruction value or the non-one-pedal deceleration instruction value for the one-pedal mode and the one-pedal acceleration/deceleration instruction value for the one-pedal mode after the mode is switched matches the non-one-pedal acceleration instruction value or deceleration instruction value for the normal mode before the mode is switched, so as to prevent the acceleration from suddenly changing or reducing if the pedal for not performing the acceleration/deceleration control in the one-pedal mode that is being operated is the accelerator pedal and the deceleration from suddenly changing or reducing if the pedal for not performing the acceleration/deceleration control in the one-pedal mode that is being operated is the brake pedal. Therefore, the acceleration/deceleration control apparatus can keep the result of the addition constant between before and after the mode is switched from the normal mode to the one-pedal mode. As a result, the acceleration/deceleration control apparatus can prevent or cut down the sudden change and/or reduction in the acceleration or the deceleration, thereby succeeding in eliminating or reducing the possibility of causing the driver to feel unconformable.

(4) According to one embodiment, in the case where the mode is switched from the normal, mode to the one-pedal mode with use of the mode switching unit while the pedal for not performing the acceleration/deceleration control in the one-pedal mode is being operated, the acceleration/deceleration control apparatus continues the control based on the non-one-pedal acceleration instruction value or deceleration instruction value for the normal mode before the mode is switched until the result of adding the non-one-pedal acceleration instruction value or the non-one-pedal deceleration instruction value for the one-pedal mode and the one-pedal acceleration/deceleration instruction value for the one-pedal mode after the mode is switched matches the non-one-pedal acceleration instruction value or deceleration instruction value for the normal mode before the mode is switched, so as to prevent the acceleration from suddenly changing or reducing if the pedal for not performing the acceleration/deceleration control in the one-pedal mode that is being operated is the accelerator pedal and the deceleration from suddenly changing or reducing if the pedal for not performing the acceleration/deceleration control in the one-pedal mode that is being operated is the brake pedal. Therefore, the acceleration/deceleration control apparatus can keep the result of the addition constant between before and after the mode is switched from the normal mode to the one-pedal mode. As a result, the acceleration/deceleration control apparatus can prevent or cut down the sudden change and/or reduction in the acceleration or the deceleration, thereby succeeding in eliminating or reducing the possibility of causing the driver to feel uncomfortable. In addition, the acceleration/deceleration control apparatus can also prevent or cut down the reduction in the acceleration, or the deceleration while performing the filter processing for resolving the difference in the instruction value between, before and after the mode is switched.

(5) According to one embodiment, in the case where the mode is switched from the one-pedal mode to the normal mode with use of the mode switching unit while the pedal for not performing the acceleration/deceleration control in the one-pedal mode is being operated, the acceleration/deceleration control apparatus performs control while adding the difference between the result of adding the non-one-pedal acceleration instruction value or deceleration instruction value for the one-pedal mode and the one-pedal acceleration/deceleration instruction value for the one-pedal mode before the mode is switched, and the non-one-pedal acceleration instruction value or deceleration instruction value for the normal mode after the mode is switched to the non-one-pedal acceleration instruction value or deceleration instruction value for the normal mode after the mode is switched, so as to prevent the acceleration from suddenly changing or reducing if the pedal for not performing the acceleration/deceleration control in the one-pedal mode that is being operated is the accelerator pedal and the deceleration from suddenly changing or reducing if the pedal for not performing the acceleration/deceleration control in the one-pedal mode that is being operated is the brake pedal. Therefore, the acceleration/deceleration control apparatus can keep the result of the addition constant between before and after the mode is switched from the one-pedal mode to the normal mode. As a result, the acceleration/deceleration control apparatus can prevent or cut down the sudden change and/or reduction in the acceleration or the deceleration, thereby succeeding in eliminating or reducing the possibility of causing the driver to feel unconformable.

Having described only several embodiments of the present invention, those skilled in the art will be able to easily appreciate that the embodiments described as the examples can be modified or improved in various manners without substantially departing from the novel teachings and advantages of the present invention. Therefore, such modified or improved embodiments are intended to be also contained in the technical scope of the present invention. The above-described embodiments may also be arbitrarily combined.

Having described the embodiments of the present invention based on the several examples, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2015-131323 filed on Jun. 30, 2015. The entire disclosure of Japanese Patent Application No. 2015-131323 filed on Jun. 30, 2015 including the specification, the claims, the drawings, and the abstract is incorporated herein by reference in its entirety.

The entire disclosure of Japanese Patent Application Public Disclosure No. 2006-137324 (PTL 1) including the specification, the claims, the drawings, and the abstract is incorporated herein by reference in its entirety.

REFERENCE SIGN LIST 4L, 4R front wheel-side wheel cylinder
5L, 5R rear wheel-side wheel cylinder
6 brake pedal
10 electric booster
12 ESC
21 accelerator pedal
23 driving motor (running motor)
25 mode switching switch (mode switching unit)
31 acceleration/deceleration control apparatus
32 accelerator pedal operation amount detection portion
33 brake pedal operation amount detection portion
34 mode switching portion (mode switching apparatus)
35 driving instruction calculation portion
36 driving force control portion
37 braking instruction calculation portion
38 braking force control portion

The invention claimed is:

1. An acceleration/deceleration control apparatus for a vehicle system, the control apparatus comprising
   a normal mode of performing acceleration control in response to an operation on an accelerator pedal and performing deceleration control in response to an operation on a brake pedal,
   a one-pedal mode of performing both the acceleration control and the deceleration control in response to an operation on any one of the accelerator pedal and the brake pedal and performing only any one of the acceleration control and the deceleration control in response to an operation on the other of pedals, and
   a mode switching unit configured to switch the one-pedal mode and the normal mode according to a switching operation per formed by an occupant,
   wherein the acceleration/deceleration control apparatus, switches a characteristic of a non-one-pedal acceleration instruction value or a non-one-pedal deceleration instruction value calculated according to an amount of the operation on the other of pedals during the one-pedal mode according to the mode switching using the mode switching unit,
   wherein the acceleration/deceleration control apparatus is configured to set a result of adding the non-one-pedal acceleration instruction value or the non-one-pedal deceleration instruction value to a one-pedal acceleration/deceleration instruction value calculated according to the operation on the one of pedals for performing tooth the acceleration control and the deceleration control as a target acceleration/deceleration instruction of a vehicle in the one-pedal mode, and
   wherein, in a case where the mode is switched with use of the mode switching unit while the other of pedals is being operated daring the one-pedal mode, the acceleration/deceleration control apparatus switches an instruction value characteristic of the other of pedals that is being operated after maintaining an acceleration or a deceleration before this mode switching.

2. The acceleration/deceleration control apparatus according to claim 1, wherein the acceleration/deceleration control apparatus maintains the acceleration or the deceleration by outputting such a one-pedal acceleration/deceleration instruction value that the result of adding the non-one-pedal acceleration instruction value or the non-one-pedal deceleration instruction value and the one-pedal acceleration/deceleration instruction value for the one-pedal mode, for the one-pedal mode after the mode is switched matches the non-one-pedal acceleration instruction value or deceleration instruction value for the normal mode before the mode is switched.

3. The acceleration/deceleration control apparatus according to claim 1, wherein the acceleration/deceleration control apparatus maintains the acceleration or the deceleration by outputting such a non-one-pedal acceleration instruction value or non-one-pedal deceleration instruction value that the result of adding the non-one-pedal acceleration instruction value or the non-one-pedal deceleration instruction value and the one-pedal acceleration/deceleration instruction value for the one-pedal mode, for the one-pedal mode after the mode is switched matches the non-one-pedal acceleration instruction value or deceleration instruction value for the normal mode before the mode is switched.

4. The acceleration/deceleration control apparatus according to claim 1, wherein the acceleration/deceleration control apparatus maintains the acceleration or the deceleration by continuously performing control based on the non-one-pedal acceleration instruction value or deceleration instruction value for the normal mode before the mode is switched until the result of adding the non-one-pedal acceleration instruction value or the non-one-pedal deceleration instruction value and the one-pedal acceleration/deceleration instruction value for the one-pedal mode, for the one-pedal mode after the mode is switched matches the non-one-pedal acceleration instruction value or deceleration instruction value for the normal mode before the mode is switched.

5. The acceleration/deceleration control apparatus according to claim 1, wherein the acceleration/deceleration control apparatus maintains the acceleration or the deceleration by performing control while adding a difference between a result of adding the non-one-pedal acceleration instruction value or deceleration instruction value and the one-pedal acceleration/deceleration instruction value for the one-pedal mode for the one-pedal mode before the mode is switched, and the non-one-pedal acceleration instruction value or deceleration instruction value for the normal mode after the mode is switched, to the non-one-pedal acceleration instruction value or deceleration instruction value tor the normal mode after the mode is switched.

* * * * *